US009846521B1

(12) United States Patent
Buchheit

(10) Patent No.: US 9,846,521 B1
(45) Date of Patent: Dec. 19, 2017

(54) GAMING SYSTEM LEVERAGING PHYSICAL POLYHEDRON WITH M FACES ROTATIONALLY LINKED TO ORDERED DATA SET OF N ELEMENTS

(71) Applicant: Brian K. Buchheit, Davie, FL (US)

(72) Inventor: Brian K. Buchheit, Davie, FL (US)

( * ) Notice: Subject to any disclaimer, the term of this patent is extended or adjusted under 35 U.S.C. 154(b) by 343 days.

(21) Appl. No.: 14/790,349

(22) Filed: Jul. 2, 2015

Related U.S. Application Data

(63) Continuation-in-part of application No. 13/568,304, filed on Aug. 7, 2012, now Pat. No. 9,046,920, and a continuation-in-part of application No. 13/567,501, filed on Aug. 6, 2012, now Pat. No. 8,520,026, and a continuation-in-part of application No. 11/468,180, filed on Aug. 29, 2006, now Pat. No. 8,259,132, and a continuation-in-part of application No. 14/728,558, filed on Jun. 2, 2015, now Pat. No. 9,740,306.

(51) Int. Cl.
G06F 3/0481 (2013.01)
G06F 3/0484 (2013.01)

(52) U.S. Cl.
CPC ...... *G06F 3/04815* (2013.01); *G06F 3/04842* (2013.01)

(58) Field of Classification Search
None
See application file for complete search history.

(56) References Cited

U.S. PATENT DOCUMENTS

| 5,303,388 A * | 4/1994 | Kreitman | G06F 3/04815 715/836 |
| 5,678,015 A * | 10/1997 | Goh | G06F 3/04815 345/419 |
| 6,529,184 B1 * | 3/2003 | Julienne | G06F 3/0312 345/157 |
| 8,970,629 B2 * | 3/2015 | Kim | G06F 3/04815 345/173 |
| 2004/0001075 A1 * | 1/2004 | Balakrishnan | G02B 27/2271 345/653 |
| 2007/0247439 A1 * | 10/2007 | Daniel | G06F 1/1601 345/173 |
| 2012/0249412 A1 * | 10/2012 | Kurata | G06F 3/0346 345/156 |

* cited by examiner

*Primary Examiner* — Edward Martello
(74) *Attorney, Agent, or Firm* — Patents on Demand P.A.; Brian K. Buchheit

(57) ABSTRACT

A communications pathway between a data handling system and a physical input device can be established. The system can include one or more processors, memories, and program instructions. The device can be a physical object having N faces along an axis of rotation. The N faces can include a display. A content item from an ordered dataset of content items can be presented within a field of a graphical user interface of the display. A number of discrete items in the ordered dataset of content items is M, where M is greater than N. Rotations of the object can be detected along the axis of rotation. Each rotation of one of the N faces can results in navigation through the dataset of content items. Responsive to each navigation through the dataset of items can result in a corresponding presentation of the navigated to one of the items within the field.

20 Claims, 16 Drawing Sheets

Embodiment 401

Sequence 410

Sequence 420

Sequence 430

Embodiment 710

*Turn 704*

*Turn 705*

*Turn 706*

Embodiment 760

Embodiment 770

GAMING SYSTEM LEVERAGING PHYSICAL POLYHEDRON WITH M FACES ROTATIONALLY LINKED TO ORDERED DATA SET OF N ELEMENTS

CROSS-REFERENCE TO RELATED APPLICATIONS

This utility patent claims the benefit of and priority to U.S. application Ser. No. 14/728,558 (filed Jun. 2, 2015, titled "Freely Rotatable Physical Object with Multiple Faces Communicating Rotation Information to a Data Handling System"). Through pending U.S. application Ser. No. 14/728,558, benefit of and priority to: U.S. application Ser. No. 13/567,501 (now U.S. Pat. No. 8,520,026) filed Aug. 6, 2012, U.S. application Ser. No. 13/568,304 (now U.S. Pat. No. 9,046,920) filed 7 Aug. 2012; and U.S. application Ser. No. 11/468,180 (now U.S. Pat. No. 8,259,132) filed Aug. 29, 2006 is claimed. The entire contents of the above applications/patents (U.S. application Ser. Nos. 14/728,558, 13/568,304; 11/468,180; and Ser. No. 13/567,501) are incorporated by reference herein in their entirety.

BACKGROUND

The present invention relates to the field of gaming systems and physical polyhedrons linked to data sets and, more particularly, to a device, method, apparatus, and computer program product for a gaming system that leverages a physical polyhedron with M faces that is rotationally linked to an ordered data set of N elements.

In traditional entertainment such as collectible card games and board games, accessories such as dice, information cards, and tokens are frequently used to permit gameplay. For example, games like monopoly and trivial pursuit utilize game-boards with dice which can allow players to move a token a random number of spaces on the game-board based on the dice roll.

In many instances, players can often lose track of these accessories over time. That is, many accessories can be misplaced or even accidentally destroyed. For example, cards from a trivial pursuit game can be lost under furniture when they fall on the floor. As a result, players often have to play with less than the required accessories. In many instances, this can hinder or even prevent gameplay with the board game when critical accessories are missing.

BRIEF SUMMARY

One aspect of the present invention can include a method for presenting elements from an ordered dataset within a graphical user interface of a multi-sided polyhedron responsive to the rotation of the polyhedron. A communications pathway between a data handling system and a physical input device can be established. The system can include one or more processors, memories, and program instructions. The device can be a physical object having N faces along an axis of rotation. The N faces can include a display. A content item from an ordered dataset of content items can be presented within a field of a graphical user interface of the display. A number of discrete items in the ordered dataset of content items can be M, where M is greater than N. Rotations of the object can be detected along the axis of rotation. Each rotation of one of the N faces can results in navigation through the dataset of content items. Responsive to each navigation through the dataset of items can result in a corresponding presentation of the navigated to one of the items within the field.

Another aspect of the present invention can include a device for presenting elements from an ordered dataset within a graphical user interface of a multi-sided polyhedron responsive to the rotation of the polyhedron. A solid polyhedral shell can have N faces along an axis of rotation where N is two or more. Motion detection components can be configured to detect motion along predetermined directional axes of the polyhedral shell. A data handler within the shell can be configured to capture movement data from the motion detection components. The data handler can include one or more processors, one or more memories, and program instructions stored on one of the one or more memories. One of the one or more processors can execute the program instructions. The data handler can navigate through an ordered dataset of content items such that one ordered data item of the ordered dataset is active at any one time. A number of discrete items in the ordered dataset of content items can be M. M can be greater than N. The captured movement data can indicates the solid polyhedral shell being rotated along the axis of rotation so that X number of faces are cycled as the object is rotated from the initial face to a post-rotation face of the N faces. In response to the solid polyhedral shell being rotated, the data handler can sequentially advance the dataset by X.

Yet another aspect of the present invention can include a system for presenting elements from an ordered dataset within a graphical user interface of a multi-sided polyhedron responsive to the rotation of the polyhedron. A physical object can have at least N faces along an axis of rotation and having an interior space. N can be two or more. The physical object can be a free moving object not directly physically tethered to any external device. The entire physical object can be rotated in space to visually expose different ones of the N faces to a visual vantage point of a human observer. Motion detection components, which are physical components contained within the interior space can be configured to detect motion along at least the axis of rotation of the physical object. A data handler can be configured to capture movement data from the motion detection components. The data handler can include one or more processors, one or more memories, and program instructions stored on one of the one or more memories. One of the one or more processors can execute the program instructions. The data handler can navigate through an ordered dataset of content items such that one ordered data item of the ordered dataset is active at any one time. A number of discrete items in the ordered dataset of content items can be M, where M is greater than N. The captured movement data can indicate the physical object being rotated along the axis of rotation so that X number of faces are cycled as the object is rotated from the initial face to a post-rotation face of the N faces. In response to the solid polyhedral shell being rotated, the data handler sequentially advances the dataset by X.

DETAILED DESCRIPTION

Figure 1:
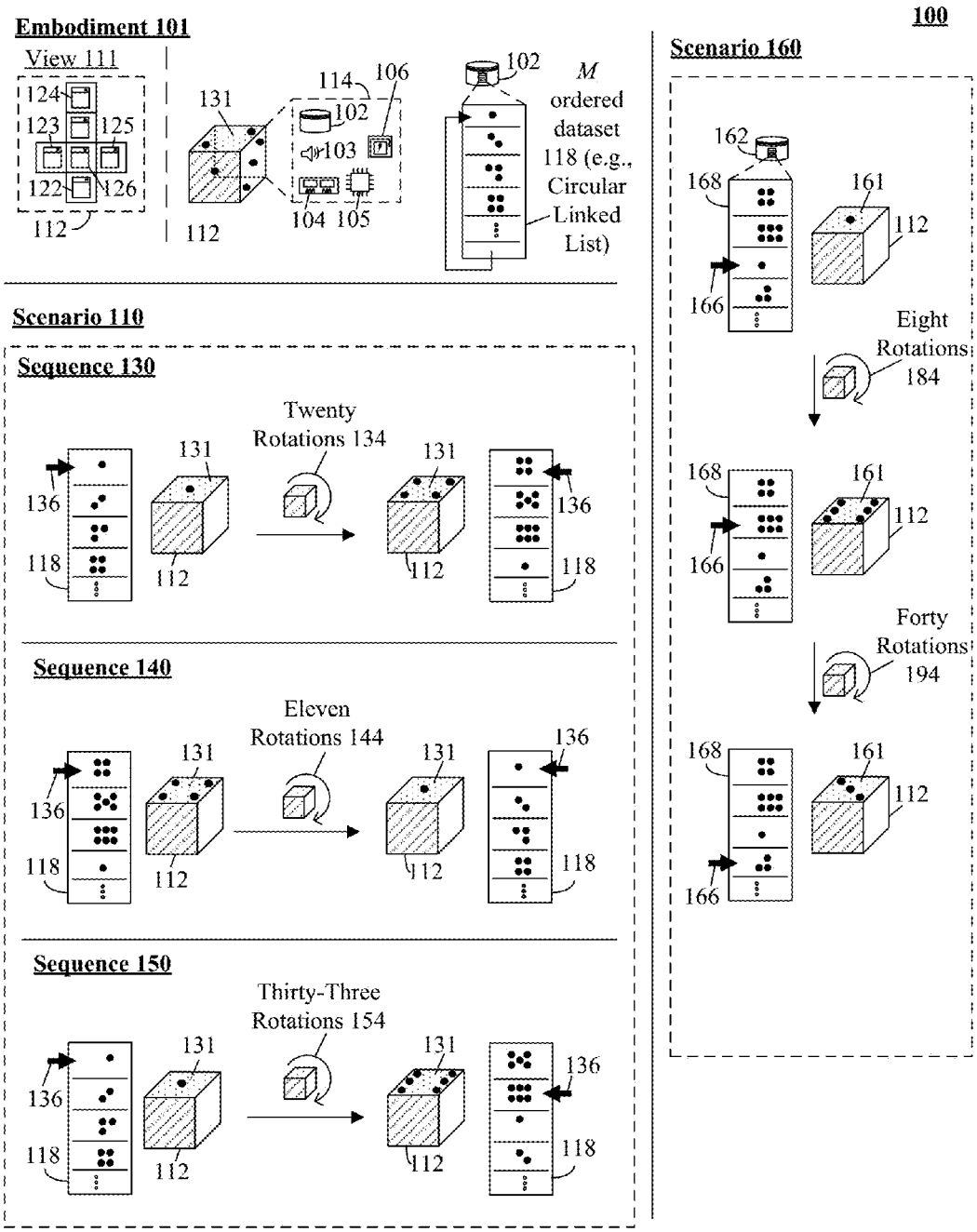
FIG. 1 is a schematic diagram illustrating an embodiment and a set of scenarios for presenting elements from an ordered dataset within a graphical user interface of a multi-sided polyhedron responsive to the rotation of the polyhedron in accordance with an embodiment of the inventive arrangements disclosed herein.

The present disclosure is a solution for presenting elements from an ordered dataset within a graphical user interface of a multi-sided polyhedron responsive to the rotation of the polyhedron. In the solution, a multi-sided polyhedron can be communicatively linked to a data store persisting an M ordered dataset. For example, polyhedron can be a six sided die which can present graphical images representing the numbers one through six on a six sided die (e.g., one number on each face of the polyhedron). When rotation of the multi-sided polyhedron is detected, navigation through the ordered dataset can be performed. For example, when a the polyhedron is rolled the number of rotations can trigger the advancement of a pointer associated with elements of the M ordered dataset to be advanced the appropriate number of times based on the number of rotations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating an embodiment 101 and a set of scenarios 110, 160 for presenting elements from an ordered dataset within a graphical user interface of a multi-sided polyhedron responsive to the rotation of the polyhedron in accordance with an embodiment of the inventive arrangements disclosed herein. Embodiment 101, scenario 110, 160 can be present in the context of embodiment 201, scenario 210, 260, embodiment 310, 401, 510, 610, scenario 630, embodiment 650, 710, 760, 810, 850, system 890, embodiment 910, 930, 950, 1010, system 1100, and/or method 1200.

In embodiment 101, a multi-sided polyhedron 112 with two or more displays can be communicatively linked to a data store 102. Data store 102 can be locally and/or remotely located from polyhedron 112. In one instance, data store 102 can be a component of a server computing device, mobile phone, tablet computing device, and the like. That is, polyhedron 112 can be communicatively linked to any traditional and/or proprietary data store. It should be appreciated that polyhedron 112 can be communicatively linked to data store 102 and/or one or more electronic components via one or more wired or wireless networks. In one instance, data communication pathways associated with polyhedron 112 can be manually and/or automatically established.

In embodiment 101, a view 111 can illustrate a two dimensional flat view of polyhedron 112. In the view, each face of the polyhedron 112 can include a display 122-126. In one instance, each display 122-126 can present similar or unique interfaces which can present one or more content persisted within a data store (e.g., 102). It should be appreciated that the polyhedron is not limited in this regard. The polyhedron 112 of embodiment 101 can be utilized within scenario 110, 160 for exemplary purposes.

Embodiment 101 can illustrate a multi-sided polyhedron 112 with multiple displays 122-126 and internal electronic components 114. In one instance, displays 122-126 can be low power electrophoretic displays (e.g., e-Ink display). In another instance, displays 122-126 can be touchscreen displays. In yet another instance, polyhedron 112 displays 122-126 can be reflective twisted nematic liquid crystal displays. For example, displays 122-126 can be simple preset words, digits, and/or graphics displays such as displays in digital clocks and watches. In one embodiment, polyhedron 112 can include multiple internal electronic components which can enable the functionality described herein. For example, polyhedron 112 can include internal components such as a processor, a flash memory storage medium (e.g., SD Card), a speaker, a battery, an accelerometer, and a BLUETOOTH LOW ENERGY transceiver. It should be appreciated that components 114 can include one or more data handling systems.

Each display 122-126 can present one or more elements of an M ordered dataset 118 stored within a data store 102. In one instance, M ordered dataset 118 can be a circular linked list. In the instance, dataset 118 can be associated with a pointer which can indicate a current element. That is, the last element within dataset 118 can include a special element which can point to the first node of the list permitting circular traversal from the first element to the last element and back to the first element. It should be appreciated that the data structure of M ordered dataset 118 is not limited to a circular linked list and can include, but is not limited to, arrays, multi-dimensional arrays, singly linked list, doubly linked list, multiply linked list, a stack, a queue, a heap, a hash table, a binary tree, a self-organizing list, a set, and the like. It should be appreciated that dataset 118 can include three or more elements. That is, M ordered dataset elements can exceed the number of displays of polyhedron 112.

In one instance, M ordered dataset 118 can be a compound data structure such as an object. In the instance, M ordered dataset 118 can be associated with one or more methods (e.g., getters, setters, traversal) for interacting with dataset 118. As used herein, a pointer can be a computer language object whose value can refer to another value stored elsewhere in a computer system. That is, a pointer can reference a location in memory of a computer system.

In one embodiment, dataset 118 can include two or more elements which can include, but is not limited to, text, audio, graphics, elements of other M ordered datasets (e.g., a pointer), and the like. For example, elements of dataset 118 can include a graphic of a pip associated with a die, where each element corresponds to the quantity of pip on each face of the die (e.g., element one has one pip, element two as two pips, etc.) That is, dataset 118 can store any arbitrary data which can be persisted within a data store of a computing system.

In scenario 110, a set of sequences 130, 140, 150 can illustrate three occurrences of rotating the polyhedron a random number of times. In the sequences 130, 140, 150, the polyhedron 112 can be represented as a three dimensional six sided cube (e.g., die). That is, polyhedron 112 can act as a physical analog of a die and can be a solid polyhedral shell of reasonable durability. It should be appreciated that this representation is for exemplary purposes only and should not be construed to limit the invention in any regard. That is, polyhedron 112 can be a cube which can function as a traditional die by presenting one or more elements of an ordered dataset 118 where the ordered list include pips (e.g., dots) conforming to traditional a six sided die. In the embodiment, display 122-126 can present appropriate pips (e.g., dots) from ordered dataset 118 representative of a numerical value. For example, polyhedron can be a six sided die which can present a two opposing pips on a user facing display (e.g., 131) to indicate a 2 has been rolled. It should be appreciated that non-user facing displays can present appropriate pips (e.g., replicating a traditional die organization scheme) and is not limited to the arrangement presented herein (e.g., only user facing displays present elements from an ordered list). In the scenario 130, 140, 150, a user facing display 131 can be the only active display which can present an element 136 from dataset 118.

In one embodiment, element 136 presented within display 131 can change responsive to rotation of polyhedron 112. For example, in sequence 130, polyhedron 112 can be rotated twenty times when a human player throws (e.g., rolls) the polyhedron a first time and in sequence 140, the polyhedron 112 can be rotated eleven times when the player throws (e.g., rolls) the polyhedron 112 again. Each time the polyhedron 112 is rotated, a pointer 136 associated with M ordered dataset 118 can be advanced through the dataset. It should be appreciated that within scenario 130-150, dataset 118 is illustrated as a circular linked list with repeating elements for exemplary purposes only.

It should be appreciated that rotation of polyhedron 112 can be detected via one or more traditional and/or proprietary methods. For example, an accelerometer associated with internal components 114 can detect the number of rotations affecting the polyhedron. In one instance, polyhedron 112 can act as a "loaded" die permitting more predictable outcomes from rotations. In the instance, M ordered dataset 118 can include duplicate entries to enable polyhedron to act as a "loaded" die. For example, dataset 118 can include (four "3s" and can lack "6s") to permit threes to be rolled more frequently.

In sequence 130, a polyhedron 112 at rest can present an element 136 from an ordered dataset 118 within user facing display 131. For example, the polyhedron 112 can present two pips commonly indicating a 2 on a six sided die.

When the polyhedron 112 is rotated (e.g., twenty rotations 134), a pointer associated with the dataset can be advanced through the dataset for each rotation (e.g., advance twenty elements). For example, when the polyhedron 112 is thrown by a player, the polyhedron 112 can rotate twenty times before stopping, thus advancing through the ordered dataset twenty times, one traversal movement for each rotation. When the polyhedron 112 is at rest, the appropriate element can be presented. For example, the polyhedron 112 can present four pips within a user facing display consistent with the element 136 to which the pointer points.

In sequence 140, the polyhedron 112 at rest can present an element 136 from an ordered dataset 118 within user facing display 131. For example, the polyhedron 112 can present four pips (e.g., from sequence 130) commonly indicating a 4 on a six sided die.

When the polyhedron 112 is rotated (e.g., eleven rotations 144), a pointer associated with the dataset can be advanced through the dataset for each rotation (e.g., advance eleven elements). For example, when the polyhedron 112 is thrown by a player, the polyhedron 112 can rotate eleven times before stopping, thus advancing through the ordered dataset eleven times, one traversal movement for each rotation. When the polyhedron 112 is at rest, the appropriate element can be presented. For example, the polyhedron 112 can present one pip within a user facing display consistent with the element 136 to which the pointer points.

In sequence 150, the polyhedron 112 at rest can present an element 136 from an ordered dataset 118 within user facing display 131. For example, the polyhedron 112 can present one pip (e.g., from sequence 140) commonly indicating a 1 on a six sided die.

When the polyhedron 112 is rotated (e.g., thirty-three rotations 154), a pointer associated with the dataset can be advanced through the dataset for each rotation (e.g., advance thirty-three elements). For example, when the polyhedron 112 is thrown by a player, the polyhedron 112 can rotate thirty-three times before stopping, thus advancing through the ordered dataset thirty-three times, one traversal movement for each rotation. When the polyhedron 112 is at rest, the appropriate element can be presented. For example, the polyhedron 112 can present six pips within a user facing display consistent with the element 136 to which the pointer points.

It should be appreciated that the disclosure is not limited to a one-to-one rotation-to-advancement ratio and can include any arbitrary ratio. For example, every two and a half rotations can trigger a pointer movement to a next element within ordered dataset 118.

Scenario 160 illustrates a randomized ordered dataset 168 which can be persisted within a data store 162. In scenario 160, a polyhedron 112 at rest can present an element 166 from an ordered dataset 168 within user facing display 161. For example, the polyhedron 112 can present one pip commonly indicating a one on a six sided die. It should be appreciated that in the scenario 160, an additional randomized factor (e.g., in addition to quantity of rotations) can be added by randomizing ordered dataset 168 to enable a high degree of randomization. Dataset 168 can be randomized utilizing traditional and/or proprietary mechanism. For example, dataset 168 can be randomized by shaking the polyhedron 112. In another instance, dataset 168 can be randomized each time a rotation is detected (e.g., for every rotation). In yet another instance, dataset 168 can be randomized when an initial rotation is detected (e.g., once per "roll").

When the polyhedron 112 is rotated (e.g., eight rotations 184), a pointer associated with the dataset can be advanced through the dataset for each rotation (e.g., advance eight elements). For example, when the polyhedron 112 is thrown by a player, the polyhedron 112 can rotate eight times before stopping, thus advancing through the randomized ordered dataset eight times, one traversal movement for each rotation. When the polyhedron 112 is at rest, the appropriate element can be presented. For example, the polyhedron 112 can present six pips within a user facing display consistent with the element 166 to which the pointer points.

When the polyhedron 112 is rotated (e.g., forty rotations 194), a pointer associated with the dataset can be advanced through the dataset for each rotation (e.g., advance forty elements). For example, when the polyhedron 112 is thrown by a player, the polyhedron 112 can rotate forty times before stopping, thus advancing through the randomized ordered dataset forty times, one traversal movement for each rotation. When the polyhedron 112 is at rest, the appropriate element can be presented. For example, the polyhedron 112 can present three pips within a user facing display consistent with the element 166 to which the pointer points.

Drawings presented herein are for illustrative purposes only and should not be construed to limit the invention in any regard. It should be appreciated that, in one instance, displays 122-126 can be inset within each face of the polyhedron to reduce physical damage from rotation (e.g., dropping the die during a die roll), collision with objects (e.g., walls, furniture), and the like.

It should be appreciated that polyhedron 112 mass, size, and/or physical properties (e.g., appearance, color) can conform to traditional die form factors. For example, polyhedron 112 weight and/or size can be identical to a six sided rounded cube die. It should be appreciated that polyhedron 112 can mimic traditional dies including, but not limited to, a non-cubic die, a rounded die, and the like. Non-cubic die can include, but is not limited to, a four sided die, an eight sided die, a ten sided die, a twelve sided die, a twenty sided die, a hundred sided die, and the like.

As used herein, polyhedron 112 can mimic a traditional die used in conventional gambling games and non-gambling games. Gambling games can include, but is not limited to a game of chance. Non-gambling games can include, but is not limited to, table games, electronic games, card games, dice based games, and the like. Table games can include, but is not limited to, board games (e.g., CHESS, MONOPOLY, TRIVIAL PURSUIT, LIFE, RISK, CANDYLAND, SORRY, SNAKES AND LADDERS), card games (e.g., POKER, RUMMY, BLACKJACK, UNO, GO FISH, BRIDGE, WAR, BACCARAT, MAGIC: THE GATHERING, YU-GI-OH!, POKEMON), dice-based games (e.g., BACKGAMMON), miniature wargames (e.g., WARHAMMER 40K), role-playing games (e.g., DUNGEONS & DRAGONS), tile-based games (e.g., DOMINOES, MAHJONG, HEROSCAPE, BATTLEMASTERS, THE SETTLERS OF CATAN, CARCASSONNE), party games, and other games that are normally played on a table or other flat surface.

As used herein, a dataset can be a collection of data persisted within a data store. Dataset can include the contents of a database table, a statistical data matrix, and the like. Dataset can be organized such that every column of the table represents a particular variable, and each row corresponds to a given member of the dataset. The data set lists values for each of the variables, such as height and weight of an object, for each member of the dataset. Each value is known as a datum. The dataset can include data for one or more members, corresponding to the number of rows.

Figure 2:
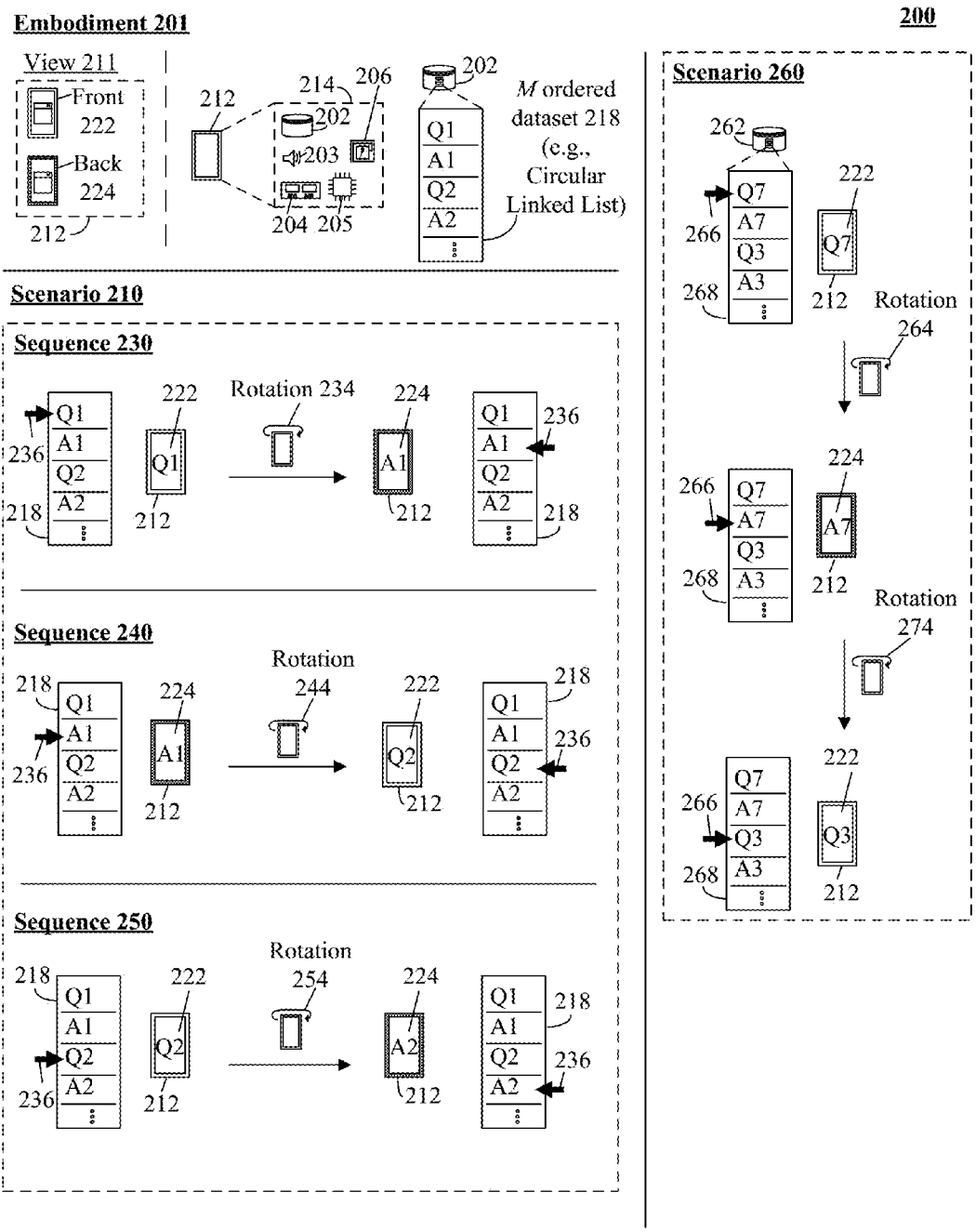
FIG. 2 is a schematic diagram illustrating an embodiment and a set of scenarios for presenting elements from an ordered dataset within a graphical user interface of a multi-sided polyhedron responsive to the rotation of the polyhedron in accordance with an embodiment of the inventive arrangements disclosed herein.

FIG. 2 is a schematic diagram illustrating an embodiment 201 and a set of scenarios 210, 260 for presenting elements from an ordered dataset within a graphical user interface of a multi-sided polyhedron responsive to the rotation of the polyhedron in accordance with an embodiment of the inventive arrangements disclosed herein. Embodiment 201, scenario 210, 260 can be present in the context of embodiment 101, scenario 110, 160, embodiment 310, 401, 510, 610, scenario 630, embodiment 650, 710, 760, 810, 910, 930, 950, 1010, system 1100, and/or method 1200.

In embodiment 201, a multi-sided polyhedron 212 with two or more displays can be communicatively linked to a data store 202. Data store 202 can be locally and/or remotely located from polyhedron 212. In one instance, data store 202 can be a component of a server computing device, mobile phone, tablet computing device, and the like. That is, polyhedron 212 can be communicatively linked to any traditional and/or proprietary data store. It should be appreciated that polyhedron 212 can be communicatively linked to data store 202 and/or one or more electronic components via one or more wired or wireless networks. In one instance, data communication pathways associated with polyhedron 212 can be manually and/or automatically established.

In embodiment 201, a view 211 can illustrate a back and front view of polyhedron 212 having two displays. In the view, polyhedron 212 can include a display 222 on a front surface and a display 224 on the back surface. In one instance, each display 222, 224 can present similar or unique interfaces which can present one or more content persisted within a data store (e.g., 202). It should be appreciated that the polyhedron is not limited in this regard. In one embodiment, polyhedron 212 shape/size can conform to an index card, playing card, business card, and the like. For example, polyhedron 212 can be the size (e.g., 3.5 inches×5 inches) of a traditional index card used to make flash cards for studying. That is, polyhedron 212 thickness can be substantially small (e.g., 0.0115 inches). It should be appreciated that polyhedron 212 thickness can be substantially larger and/or smaller than traditional card stocks. It should be appreciated that polyhedron 212 can be referred to as a double sided polyhedron to emphasize the two opposing displays and the polyhedron 212 and/or embodiment 201 is not limited in this regard.

Embodiment 201 can illustrate a double sided polyhedron 212 with two displays 222, 224 and internal electronic components 214. In one instance, displays 222, 224 can be low power electrophoretic displays (e.g., e-Ink display). In another instance, displays 222, 224 can be touchscreen displays. In yet another instance, polyhedron 212 displays 222, 224 can be reflective twisted nematic liquid crystal displays. For example, displays 222, 224 can be simple preset words, digits, and/or graphics displays such as displays in digital clocks and watches. In one embodiment, polyhedron 212 can include multiple internal electronic components which can enable the functionality described herein. For example, polyhedron 212 can include internal components such as a processor, a flash memory storage medium (e.g., SD Card), a speaker, a battery, an accelerometer, and a BLUETOOTH LOW ENERGY transceiver.

Each display 222, 224 can present one or more elements of an M ordered dataset 218 stored within a data store 202. In one instance, M ordered dataset 118 can be a circular linked list. That is, the last element within dataset 218 can point back to the first node of the list permitting circular traversal from the first element to the last element and back to the first element. It should be appreciated that the data structure of M ordered dataset 218 is not limited to a circular linked list and can include, but is not limited to, arrays, multi-dimensional arrays, singly linked list, doubly linked list, multiply linked list, a stack, a queue, a heap, a hash table, a binary tree, a self-organizing list, a set, and the like.

In one instance, M ordered dataset 218 can be a compound data structure such as an object. In the instance, M ordered dataset 218 can be associated with one or more methods (e.g., getters, setters, traversal) for interacting with dataset 218. It should be appreciated that elements within 218 can be paired (e.g., Q1, A1) to enable a logical ordering and/or grouping of elements or can be unpaired. It should be appreciated that M ordered dataset 218 can be arbitrarily large and/or complex. For example, dataset 218 can include two hundred elements (e.g., one hundred questions and one hundred answers).

It should be understood that the polyhedron 112 of embodiment 201 can be utilized within scenario 210, 260 for exemplary purposes.

In scenario 210, a set of sequences 230, 240, 250 can illustrate three occurrences of rotating the polyhedron 212 once along a directional axis. In the sequences 230, 240, 250, the polyhedron 212 can be represented as a double sided card. That is, polyhedron 212 can function as a traditional flash card by presenting one or more elements of an ordered dataset 218 where the ordered list includes a question and an answer conforming to traditional flash card organization. It should be appreciated that this representation is for exemplary purposes only and should not be construed to limit the invention in any regard. In one instance, polyhedron 212 can act as a physical analog of a double sided index card and can be a solid polyhedral shell of reasonable durability (e.g., flexible, non-flexible).

As used herein, a flash card can be a cards bearing information (e.g., words, numbers) on either or both sides of the card. Flash card can include, vocabulary, historical dates, formulas, or any subject matter that can be learned via a question and answer format. Flash cards are widely used as a learning drill to aid memorization by way of spaced repetition. In one instance, dataset 218 can include any content including, but no limited to, states and capitals, grammatical rules, pronunciation information, vocabulary (e.g., words), and the like. That is, dataset 218 can present traditional flash card information for teaching children (e.g., K-12), adults (e.g., GRE TEST PREP, SAT TEST PREP), and the like.

In the embodiment, display 222, 224 can present an appropriate question or answer from ordered dataset 218. For example, polyhedron 212 can be a present a question on the user facing display (e.g., front display 222) and when rotated to the back display 224, the back display 224 can present the appropriate answer on the user facing display (e.g., back display 224). It should be appreciated that non-user facing displays can simultaneously present content from dataset 218 and is not limited to the arrangement presented herein (e.g., only user facing displays present elements from an ordered list). In the scenario 230, 240, 250, a user facing display can be the only active display which can present an element 236 from dataset 218.

In one embodiment, element 236 presented within display can change responsive to rotation of polyhedron 212. For example, in sequence 240, polyhedron 212 can be rotated when a human user rotates (e.g., flips) the polyhedron from the back display 224 to the front display 222. Each time the polyhedron 212 is rotated, a pointer 236 associated with M ordered dataset 218 can be advanced through the dataset. It should be appreciated that within scenario 230-250, dataset 218 is illustrated as a circular linked list with repeating elements for exemplary purposes only.

It should be appreciated that rotation of polyhedron 212 can be detected via one or more traditional and/or proprietary methods. For example, an accelerometer associated with internal components 214 can detect the number of rotations affecting the polyhedron.

In sequence 230, a polyhedron 212 at rest can present an element 236 from an ordered dataset 218 within user facing display (e.g., front display 222). For example, the polyhedron 212 can present a question (e.g., Q1) associated with a math problem (e.g., 2+2).

When the polyhedron 212 is rotated, a pointer associated with the dataset 218 can be advanced through the dataset for each rotation. For example, when the polyhedron 112 is flipped by a user, the pointer can be advanced through the ordered dataset once. When the polyhedron 212 is at rest, the appropriate element can be presented. For example, the polyhedron 212 can present an answer A1 associated with a question Q1 within a user facing display (e.g., back display 224) consistent with the element 236 to which the pointer points.

In sequence 240, the polyhedron 212 at rest can present an element 236 from an ordered dataset 218 within user facing display (e.g., back display 224). For example, the polyhedron 212 can present answer A1 (e.g., from sequence 230).

When the polyhedron 212 is rotated, a pointer associated with the dataset can be advanced through the dataset for each rotation. For example, when the polyhedron 212 is flipped by a user, the pointer can advance through the ordered dataset once. When the polyhedron 212 is at rest, the appropriate element can be presented. For example, the polyhedron 212 can present a new question Q2 within a user facing display (e.g., front display 222) consistent with the element 236 to which the pointer points.

In sequence 250, the polyhedron 212 at rest can present an element 236 from an ordered dataset 218 within user facing display (e.g., 222). For example, the polyhedron 212 can present a question (e.g., from sequence 240).

When the polyhedron 212 is rotated, a pointer associated with the dataset can be advanced through the dataset for each rotation. For example, when the polyhedron 212 is flipped by a user, the pointer can advance through the ordered dataset once. When the polyhedron 212 is at rest, the appropriate element can be presented. For example, the polyhedron 212 can present an answer A2 associated with a question Q2 within a user facing display (e.g., back display 224) consistent with the element 236 to which the pointer points.

It should be appreciated that the disclosure is not limited to a one-to-one rotation-to-advancement ratio and can include any arbitrary ratio. For example, every one rotation can trigger a pointer movement to move twice within ordered dataset 218 (e.g., showing only questions or only answers). It should be appreciated that the presentation of elements within dataset 218 is not limited to the polyhedron being at rest and can be presented while the polyhedron is in motion.

Scenario 260 illustrates a randomized ordered dataset 168 which can be persisted within a data store 262. In scenario 260, a polyhedron 212 at rest can present an element 266 from an ordered dataset 268 within user facing display (e.g., 222). For example, the polyhedron 212 can present a question Q7. Dataset 268 can be randomized utilizing traditional and/or proprietary mechanism. For example, dataset 268 can be randomized by shaking the polyhedron 212. In another instance, dataset 268 can be randomized when a shuffle gesture action is performed. For example, dataset 268 can be randomized when a Hindu shuffle gesture or overhand shuffle gesture is detected.

When the polyhedron 212 is rotated, a pointer associated with the dataset can be advanced through the dataset for each rotation. For example, when the polyhedron 212 is rotated by a user, the pointer can advance through the randomized ordered dataset once, one traversal movement for each rotation. When the polyhedron 212 is at rest, the appropriate element can be presented. For example, the polyhedron 212 can present an appropriate answer A7 associated with a question Q7 presented on display 222 within a user facing display (e.g., 224) consistent with the element 266 to which the pointer points.

When the polyhedron 212 is rotated, a pointer associated with the dataset can be advanced through the dataset for each rotation. For example, when the polyhedron 212 is flipped by a user, the pointer can advance through the randomized ordered dataset once, one traversal movement for each rotation. When the polyhedron 212 is at rest, the appropriate element can be presented. For example, the polyhedron 212 can present a new question (e.g., Q3) within a user facing display (e.g., 222) consistent with the element 266 to which the pointer points.

Drawings presented herein are for illustrative purposes only and should not be construed to limit the invention in any regard. It should be appreciated that, in one instance, displays 222, 224 can be inset within each face of the polyhedron to reduce physical damage from rotation (e.g., dropping the die during user), collision with objects (e.g., desks, stationary), and the like.

It should be appreciated that polyhedron 212 mass, size, and/or physical properties (e.g., appearance, color) can conform to traditional flash card form factors. For example, polyhedron 212 weight and/or size can be identical to a 5×8 inch index card. It should be appreciated that polyhedron 212 can mimic traditional flash cards including, but not limited to, electronic flash cards, paper flash cards, and the like.

It should be appreciated that the embodiment 201 is distinctly different from traditional electronic flash card devices. In the embodiment, the polyhedron 212 can include two opposing displays, front and back display. That is, the front display (e.g., front 222) is a user facing display visible to a user and the back display (e.g., back 224) is not visible to the user while the front display is visible.

Figure 3:
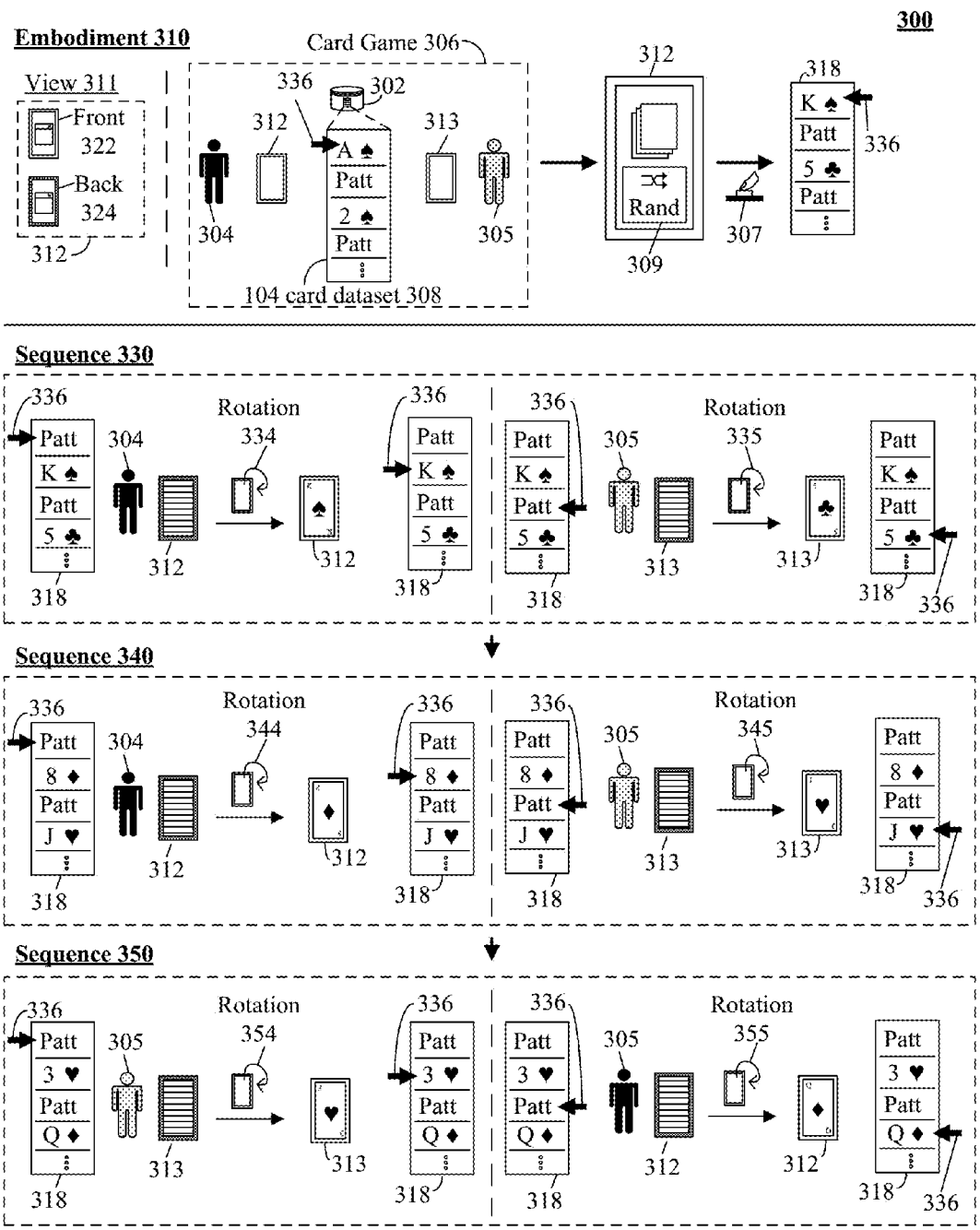
FIG. 3 is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.

FIG. 3 is a schematic diagram illustrating an embodiment 310 for presenting elements from an ordered dataset within a graphical user interface of a multi-sided polyhedron responsive to the rotation of the polyhedron in accordance with an embodiment of the inventive arrangements disclosed herein. Embodiment 310 can be present in the context of embodiment 101, scenario 110, 160 embodiment 201, scenario 210, 260, embodiment 401, 510, 610, scenario 630, embodiment 650, 710, 760, 810, 850, system 890, embodiment 910, 930, 950, 1010, system 1100, and/or method 1200. It should be appreciated that embodiment 310 can be present in the context of sequence 330, 340, 350.

In embodiment 310, a view 311 can illustrate a back and front view of polyhedron 312 having two displays. In the view, polyhedron 312 can include a display 322 on a front surface and a display 324 on the back surface. In one instance, each display 322, 324 can present similar or unique interfaces which can present one or more content persisted within a data store (e.g., 302). It should be appreciated that the polyhedron is not limited in this regard. In one embodiment, polyhedron 312 shape/size can conform to a playing card (e.g., fifty two card deck). For example, polyhedron 312 can be the size (e.g., 3.5 inches×2.5 inches) of a playing card from a fifty two card French playing card deck. That is, polyhedron 312 thickness can be substantially small (e.g., 0.0115 inches). It should be appreciated that polyhedron 312 thickness can be substantially larger and/or smaller than traditional playing card thickness. For example, polyhedron 312 can be the thickness of a traditional credit card. It should be appreciated that polyhedron 312 can be referred to as a double sided polyhedron to emphasize the two opposing displays and the polyhedron 312 and/or embodiment 310 is not limited in this regard.

Embodiment 310 can illustrate a double sided polyhedron 312 with two displays 322, 324 and internal electronic components 314. In one instance, displays 322, 324 can be low power electrophoretic displays (e.g., e-Ink display). In another instance, displays 322, 324 can be touchscreen displays. In yet another instance, polyhedron 312 displays 322, 324 can be reflective twisted nematic liquid crystal displays. For example, displays 322, 324 can be simple preset words, digits, and/or graphics displays such as displays in digital clocks and watches. In one embodiment, polyhedron 312 can include multiple internal electronic components which can enable the functionality described herein. For example, polyhedron 312 can include internal components such as a processor, a flash memory storage medium (e.g., SD Card), a battery, an accelerometer, and a BLUETOOTH LOW ENERGY transceiver.

It should be appreciated that polyhedron 313 can be identical to polyhedron 312. It should be appreciated that polyhedron 312, 313 displays can present arbitrarily complex graphics.

Each display of each polyhedron 312, 313 can present one or more elements of an M ordered dataset 318 stored within a data store 302. In one instance, M ordered dataset 318 can be a circular linked list. That is, the last element within dataset 318 can point back to the first node of the list permitting circular traversal from the first element to the last element and back to the first element. It should be appreciated that the data structure of M ordered dataset 318 is not limited to a circular linked list and can include, but is not limited to, arrays, multi-dimensional arrays, singly linked list, doubly linked list, multiply linked list, a stack, a queue, a heap, a hash table, a binary tree, a self-organizing list, a set, and the like.

In one instance, M ordered dataset 318 can be a compound data structure such as an object. In the instance, M ordered dataset 318 can be associated with one or more methods (e.g., getters, setters, traversal) for interacting with dataset 318. In one instance, dataset 318 can be a 104 element set which can mimic a fifty two card deck. In the instance, each element can be a card face (e.g., 52 faces) or an associated card backs (e.g., cross hash pattern). That is, each element of the dataset 318 can correspond to the front or back of a playing card. It should be appreciated that elements within 318 can be paired (e.g., card face, card pattern) to enable a logical ordering and/or grouping of elements or can be unpaired. In one instance, polyhedron 312, 313 can be linked to the same ordered dataset 318. In one embodiment, each element of dataset 318 can be linked to one or more additional content (e.g., graphics, animation, text). For example, dataset 318 element can be a text element (e.g., King of Hearts) which can be linked to a graphic of a traditional King of Hearts playing card.

It should be appreciated that polyhedron 312, 313 can be communicatively linked to data store 302 and/or one or more electronic components via one or more wired or wireless networks.

A card game 306 can include a player 304 using a polyhedron 312 and a player 305 using a polyhedron 313. In one instance, player 312 can select 307 a user interface element 309 which can randomize the order of the elements within dataset 318. For example, card game 306 can be a game of War card game between two friends each using a polyhedron 312, 313 to present their cards each round. The player 304, 305 with the polyhedron 312, 313 with the higher value can win the round. The winner of the previous round can have the next turn.

Sequence 330, 340, 350 can illustrate three rounds of card game 306. A round can include each player 304, 305 presenting a card and the card with the higher value wins the round. In the sequences 330, 340, 350, the polyhedron 312, 313 can be represented as a double sided card. That is, polyhedron 312, 313 can function as a traditional playing card allowing each player to advance once through the dataset 318 for each card that can be "drawn". It should be appreciated that this representation is for exemplary purposes only and should not be construed to limit the invention in any regard.

As used herein, a playing card can be a piece of specially prepared heavy paper, thin cardboard, plastic-coated paper, cotton-paper blend, or thin plastic, marked with distinguishing motifs and used as one of a set for playing card games. Each playing card can have a front which can include a value and a back which can include an identical pattern for each card. Cards can be a part of a deck which can include fifty two cards. The deck can includes thirteen ranks of each of the four French suits, clubs (♣), diamonds (♦), hearts (♥) and spades (♠), with reversible "court" or face cards. It should be appreciated that the disclosure is not limited in this regard and can mimic any card type, design, and, the like. For example, playing card can be one or more cards from a BICYCLE POKER deck. A deck (e.g., pack) can be a collection of two or more related or unrelated cards which can be used to perform an action (e.g., play a game).

In the embodiment, display of polyhedron 312, 313 can present faces or patterns from ordered dataset 318. For example, polyhedron 312 can be a present a Jack of Hearts on the user facing display (e.g., front display 322) and when rotated to the back display 324, the back display 324 can present a pattern on the user facing display (e.g., back display 324). It should be appreciated that non-user facing displays can simultaneously present content from dataset 318 and is not limited to the arrangement presented herein (e.g., only user facing displays present elements from an ordered list). In the scenario 330, 340, 350, a user facing display can be the only active display which can present an element 336 from dataset 318.

In one embodiment, element 336 presented within display can change responsive to rotation of polyhedron 312. For example, in sequence 340, polyhedron 312 can be rotated when a human user rotates (e.g., flips) the polyhedron from the back display 324 to the front display 322. Each time the polyhedron 312 is rotated, a pointer 336 associated with M ordered dataset 318 can be advanced through the dataset. It should be appreciated that within scenario 330-350, dataset 318 is illustrated as a circular linked list with repeating elements for exemplary purposes only.

It should be appreciated that rotation of polyhedron 312 can be detected via one or more traditional and/or proprietary methods. For example, an accelerometer associated with internal components 314 can detect the number of rotations affecting the polyhedron.

In sequence 330, a polyhedron 312 at rest can present an element 336 from an ordered dataset 318 within user facing display. When the polyhedron 312 is at rest, the appropriate element can be presented (e.g., pattern). For example, the polyhedron 312 can present a graphic of a playing card pattern.

When the polyhedron 312 is rotated by player 304, a pointer associated with the dataset 318 can be advanced through the dataset the each rotation. For example, when the polyhedron 312 is flipped by a player 304, the pointer can be advanced through the ordered dataset once. For example, the polyhedron 312 can present a card face (e.g., King of Spades) within a user facing display consistent with the element 336 to which the pointer points.

When the polyhedron 313 is at rest, the appropriate element can be presented (e.g., pattern). For example, the polyhedron 313 can present a pattern within a user facing display consistent with the element 336 to which the pointer points. When the polyhedron 313 is rotated by player 305, a pointer associated with the dataset 318 can be advanced through the dataset for the rotation. For example, when the polyhedron 313 is flipped by player 305, the pointer can be advanced through the ordered dataset once.

That is, each player 304, 305 can take turns "drawing" (e.g., rotating) and presenting their card face up similar to traditional playing card rules for the game.

In sequence 340, the polyhedron 312 at rest can present an element 336 from an ordered dataset 318 within user facing display. When the polyhedron 312 is at rest, the appropriate element can be presented (e.g., pattern). For example, the polyhedron 312 can present a pattern within a user facing display consistent with the element 336 to which the pointer points.

When the polyhedron 312 is rotated, a pointer associated with the dataset can be advanced through the dataset for each rotation. For example, when the polyhedron 312 is flipped by player 304, the pointer can advance through the ordered dataset once. For example, the polyhedron 312 can present a graphic of an Eight of Diamonds (e.g., eight diamonds pips and numeric "8").

When the polyhedron 313 is at rest, the appropriate element can be presented (e.g., pattern). For example, the polyhedron 313 can present a pattern within a user facing display consistent with the element 336 to which the pointer points. When the polyhedron 313 is rotated by player 305, a pointer associated with the dataset 318 can be advanced through the dataset for the rotation. For example, when the polyhedron 313 is flipped by player 305, the pointer can be advanced through the ordered dataset once presenting a Jack of Hearts graphic. It should be appreciated that the value presented on polyhedron 313 is larger than the value presented on polyhedron 312 which can allow player 305 to take the next turn in sequence 350. That is, when user 305 rotates polyhedron 313, the pointer can be advanced through the ordered dataset In sequence 350, the polyhedron 312, 313 at rest can present an element 336 from an ordered dataset 318 within user facing display.

When the polyhedron 313 is at rest, the appropriate element can be presented (e.g., pattern). For example, the polyhedron 313 can present a pattern within a user facing display consistent with the element 336 to which the pointer points. When the polyhedron 313 is rotated by player 305, a pointer associated with the dataset 318 can be advanced through the dataset for the rotation. For example, when the polyhedron 313 is flipped by player 305, the pointer can be advanced through the ordered dataset once presenting a Three of Hearts graphic.

When the polyhedron 312 is at rest, the appropriate element can be presented (e.g., pattern). For example, the polyhedron 312 can present a pattern within a user facing display consistent with the element 336 to which the pointer points. When the polyhedron 312 is rotated, a pointer associated with the dataset can be advanced through the dataset for each rotation. For example, when the polyhedron 312 is flipped by player 304, the pointer can advance through the ordered dataset once. For example, the polyhedron 312 can present a graphic of a Queen of Diamonds (e.g., Queen of Diamonds graphics).

It should be appreciated that the disclosure is not limited to a one-to-one rotation-to-advancement ratio and can include any arbitrary ratio. For example, every one rotation can trigger a pointer movement to move twice within ordered dataset 218 (e.g., showing only questions or only answers). It should be appreciated that the presentation of elements within dataset 318 is not limited to the polyhedron being at rest and can be presented while the polyhedron is in motion.

Drawings presented herein are for illustrative purposes only and should not be construed to limit the invention in any regard. It should be appreciated that, in one instance, displays 322, 324 can be inset within each face of the polyhedron to reduce physical damage from rotation (e.g., dropping the die during user), collision with objects (e.g., desks, stationary), and the like. It should be appreciated that the disclosure can permit players remote from each other to play card game 306 via 312, 313. In one instance, polyhedron 312, 313 can appropriately display players 304, 305 cards during each round, enabling both players 304, 305 to interact with each other.

It should be appreciated that polyhedron 312, 313 mass, size, and/or physical properties (e.g., appearance, color) can conform to traditional playing card form factors. For example, polyhedron 312, 313 weight and/or size can be identical to a 2.5×3.5 playing card.

Figure 4:
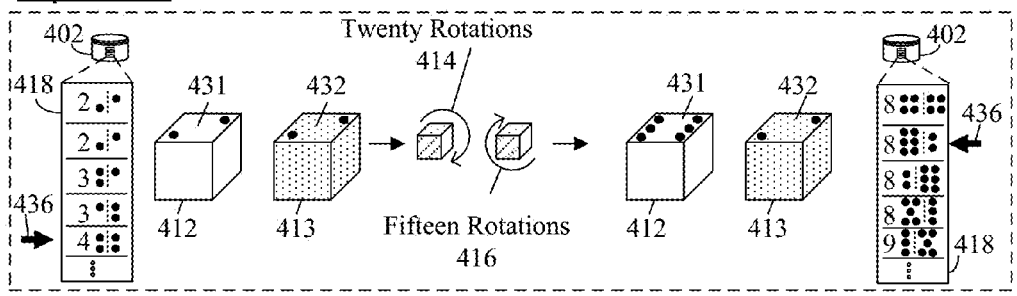
FIG. 4 is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.
Figure 4:
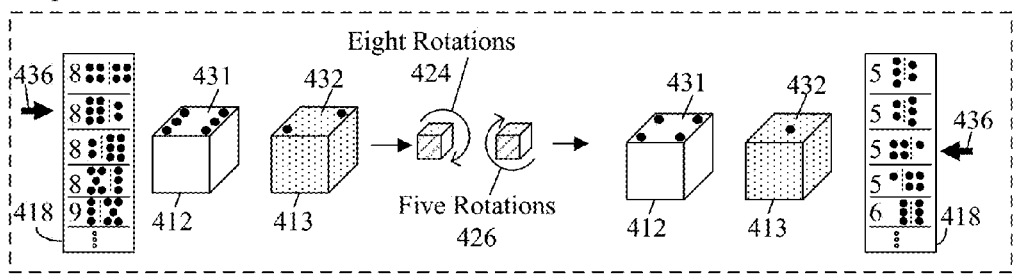
Figure 4:
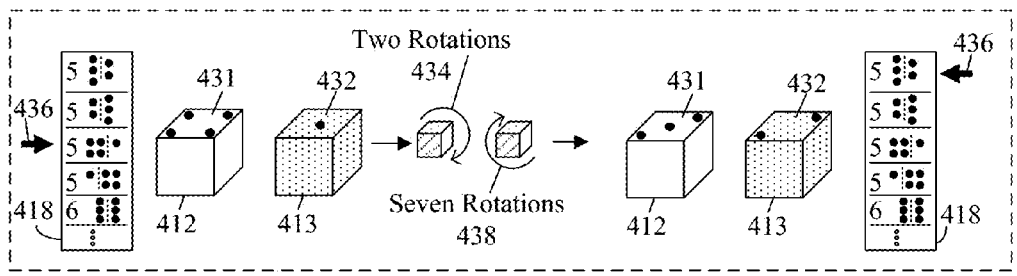

FIG. 4 is a schematic diagram illustrating an embodiment 401 for presenting elements from an ordered dataset within a graphical user interface of a multi-sided polyhedron responsive to the rotation of the polyhedron in accordance with an embodiment of the inventive arrangements disclosed herein. Embodiment 401 can be present in the context of embodiment 101, scenario 110, 160, embodiment 201, scenario 210, 260, embodiment 310, 510, 610, scenario 630, embodiment 650, 710, 760, 810, 850, system 890, embodiment 910, 930, 950, 1010, system 1100, and/or method 1200. Embodiment 401 can include a set of sequences 410, 420, 430 in which a multi-sided polyhedron 412, 413 can present elements from an M ordered dataset 418 responsive to a rotation of the polyhedron 412, 413. It should be appreciated that polyhedron 412, 413 rotation can be dependent or can be independent.

Embodiment 401 can illustrate a two multi-sided polyhedrons 412, 413 with multiple displays and internal electronic components. In one instance, M ordered dataset 418 can be a compound data structure such as an object. In one configuration of the instance, elements 436 within dataset 418 can represent the total combinations possible for two six sided dice. For example, an element 436 can include two values, one each for each polyhedron 431 (e.g., two pips), 432 (e.g., one pip). That is, embodiment 401 can outline the presentation of probability dependent content associated with polyhedron 412, 413.

In embodiment 401, a set of sequences 410, 420, 430 can illustrate three occurrences of rotating the polyhedrons 412, 413 a random number of times. In the sequences 410, 420, 430, the polyhedron 412, 413 can be represented as a six sided die. It should be appreciated that this representation is for exemplary purposes only and should not be construed to limit the invention in any regard. That is, polyhedron 412, 413 can be a cube which can function as a traditional die by presenting one or more elements of an ordered dataset 418 where the ordered list include pips (e.g., dots) conforming to traditional a six sided die. In the embodiment, display can present appropriate pips (e.g., dots) from ordered dataset 418 representative of a numerical value. For example, polyhedron can be a six sided die which can present a two opposing pips on a user facing display (e.g., 431) to indicate a 2 has been rolled. It should be appreciated that non-user facing displays can present appropriate pips (e.g., replicating a traditional die organization scheme) and is not limited to the arrangement presented herein (e.g., only user facing displays present elements from an ordered list). In the scenario 410, 420, 430, a user facing display 431, 432 can be the only active display which can present an element 436 from dataset 418.

In one embodiment, element 436 presented within display 431, 432 can change responsive to rotation of polyhedron 412, 413. For example, in sequence 420, polyhedron 412 can be rotated twenty times and polyhedron 413 can be rotated fifteen times when a human player throws (e.g., rolls) the polyhedron. Each time the polyhedron 412, 413 is rotated, a pointer 436 associated with M ordered dataset 418 can be advanced through the dataset. It should be appreciated that within sequence 410, 420, 430, dataset 418 is illustrated as a circular linked list with repeating elements for exemplary purposes only.

It should be appreciated that rotation of polyhedron 412 can be detected via one or more traditional and/or proprietary methods. For example, an accelerometer associated with internal components can detect the number of rotations affecting the polyhedron.

In sequence 410, a polyhedron 412, 413 at rest can present an element 436 from an ordered dataset 418 within user facing display 431, 432. For example, the polyhedron 412, 413 can present two pips each commonly indicating a roll of four on two six sided die.

When the polyhedron 412, 413 is rotated (e.g., twenty rotations 414 and fifteen rotations 416), a pointer associated with the dataset can be advanced through the dataset for each rotation (e.g., advance thirty five elements). For example, when the polyhedron 412, 413 is thrown by a player, the polyhedron 412 can rotate twenty times before stopping and the polyhedron 413 can rotate fifteen times before stopping, thus advancing through the ordered dataset thirty five times, one traversal movement for each rotation. When the polyhedron 412, 413 is at rest, the appropriate element can be presented. For example, the polyhedron 412, 413 can present six pips and two pips within a user facing display consistent with the element 436 to which the pointer points.

In sequence 420, the polyhedron 412, 413 at rest can present an element 136 from an ordered dataset 118 within user facing display 431, 432. For example, the polyhedron 412, 432 can present six pips and two pips (e.g., from sequence 410) commonly indicating a dice roll of eight on two six sided dice.

When the polyhedron 412, 413 is rotated (e.g., eight rotations 424 and five rotations 426), a pointer associated with the dataset can be advanced through the dataset for each rotation (e.g., advance thirteen elements). For example, when the polyhedron 412 is thrown by a player, the polyhedron 412 can rotate eight times before stopping and the polyhedron 413 can rotation five times before stopping, thus advancing through the ordered dataset thirteen times, one traversal movement for each rotation. When the polyhedron 412, 413 is at rest, the appropriate element can be presented. For example, the polyhedron 412 can present four pips and polyhedron 413 can present one pip within a user facing display consistent with the element 436 to which the pointer points.

In sequence 430, the polyhedron 412, 413 at rest can present an element 136 from an ordered dataset 418 within user facing display 431. For example, the polyhedron 412 can present four pips and the polyhedron 413 can present one pip (e.g., from sequence 420) commonly indicating a six on two six sided dice.

When the polyhedron 412, 413 is rotated (e.g., two rotations 434 and seven rotations 438), a pointer associated with the dataset can be advanced through the dataset for each rotation (e.g., advance nine elements). For example, when the polyhedron 412 is thrown by a player, the polyhedron 412 can rotate two times before stopping and the polyhedron 413 can rotate seven times fore stopping, thus advancing through the ordered dataset nine times, one traversal movement for each rotation. When the polyhedron 412, 413 is at rest, the appropriate element can be presented. For example, the polyhedron 412 can present three pips and the polyhedron 413 can present two pips within a user facing display consistent with the element 436 to which the pointer points.

Drawings presented herein are for illustrative purposes only and should not be construed to limit the invention in any regard. It should be appreciated that the polyhedron 412, 413 can be utilized to represent any combination of dice (e.g., a 20 sided die and a four sided die) and is not limited to the embodiment 410 presented herein. In one instance, multiple ordered datasets can be utilized (e.g., one set for each polyhedron 412, 413).

Figure 5:
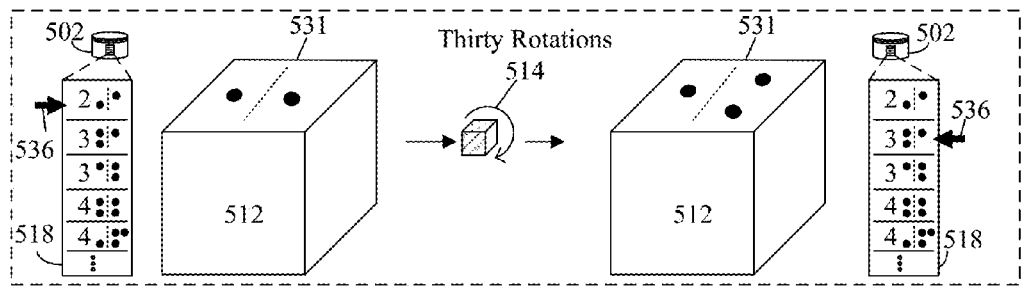
FIG. 5 is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.
Figure 5:
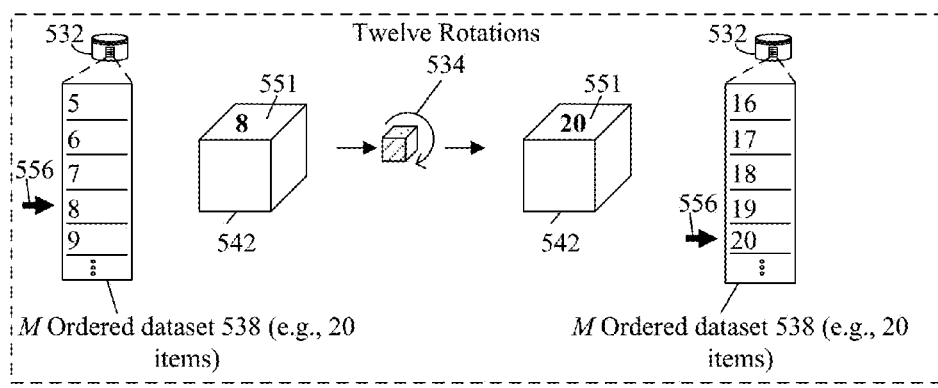

FIG. 5 is a schematic diagram illustrating an embodiment 510 for presenting elements from an ordered dataset within a graphical user interface of a multi-sided polyhedron responsive to the rotation of the polyhedron in accordance with an embodiment of the inventive arrangements disclosed herein. Embodiment 510 can be present in the context of embodiment 101, scenario 110, 160, embodiment 201, scenario 210, 260, embodiment 310, 401, 610, scenario 630, embodiment 650, 710, 760, 810, 850, system 890, embodiment 910, 930, 950, 1010, system 1100, and/or method 1200.

Embodiment 510 can illustrate a multi-sided polyhedron 512 with multiple displays and internal electronic components. In one instance, M ordered dataset 518 can be a data structure persisted within a data store 502. In one configuration of the instance, elements 536 within dataset 518 can represent the total combinations possible for two six sided dice. For example, an element 536 can include two values, one each for each dice which can presented within a user facing display 531 (e.g., one pip and one pip). That is, embodiment 510 can outline the presentation of probability dependent content associated with polyhedron 512.

In embodiment 510, a polyhedron 512 at rest can present an element 536 from an ordered dataset 518 within user facing display 531. For example, the polyhedron 412 can present two pips each commonly indicating a roll of four on two six sided die.

When the polyhedron 512 is rotated (e.g., thirty rotations 514, a pointer associated with the dataset can be advanced through the dataset for each rotation (e.g., advance thirty elements). For example, when the polyhedron 512 is thrown by a player, the polyhedron 512 can rotate thirty times before stopping, thus advancing through the ordered dataset thirty times, one traversal movement for each rotation. When the polyhedron 512 is at rest, the appropriate element can be presented. For example, the polyhedron 512 can present one pip and two pips for a total of three within a user facing display consistent with the element 536 to which the pointer points.

Embodiment 530 can illustrate a multi-sided polyhedron 542 with multiple displays and internal electronic components. In one instance, M ordered dataset 538 can be a data structure such a linked list which can be persisted within a data store 532. In one configuration of the instance, elements 556 within dataset 538 can represent the total combinations possible for two six sided dice. For example, an element 556 can include a value (e.g., "15") for a twenty sided die which can presented within a user facing display 551. That is, embodiment 530 can outline the presentation of probability dependent content associated with polyhedron 542.

In embodiment 530, a polyhedron 542 at rest can present an element 556 from an ordered dataset 538 within user facing display 551. For example, the polyhedron 542 can present a random value indicating a starting value on a twenty sided die (e.g., "8").

When the polyhedron 542 is rotated (e.g., twelve rotations 534, a pointer associated with the dataset can be advanced through the dataset for each rotation (e.g., advance twelve elements). For example, when the polyhedron 542 is thrown by a player, the polyhedron 542 can rotate twelve times before stopping, thus advancing through the ordered dataset twelve times, one traversal movement for each rotation. When the polyhedron 542 is at rest, the appropriate element can be presented. For example, the polyhedron 542 can present a value of "20" within a user facing display consistent with the element 556 to which the pointer points.

Drawings presented herein are for illustrative purposes only and should not be construed to limit the invention in any regard. It should be appreciated that, in one instance, displays of polyhedron 512, 542 can be inset within each face of the polyhedron to reduce physical damage from rotation (e.g., dropping the die during a die roll), collision with objects (e.g., walls, furniture), and the like.

It should be appreciated that polyhedron 512, 542 mass, size, and/or physical properties (e.g., appearance, color) can conform to traditional die form factors. For example, polyhedron 542 weight and/or size can be identical to a twenty sided die. It should be appreciated that polyhedron 512, 542 can mimic traditional dies including, but not limited to, a non-cubic die, a rounded die, and the like. Non-cubic die can include, but is not limited to, a four sided die, an eight sided die, a ten sided die, a twelve sided die, a twenty sided die, a hundred sided die, and the like.

Figure 6A:
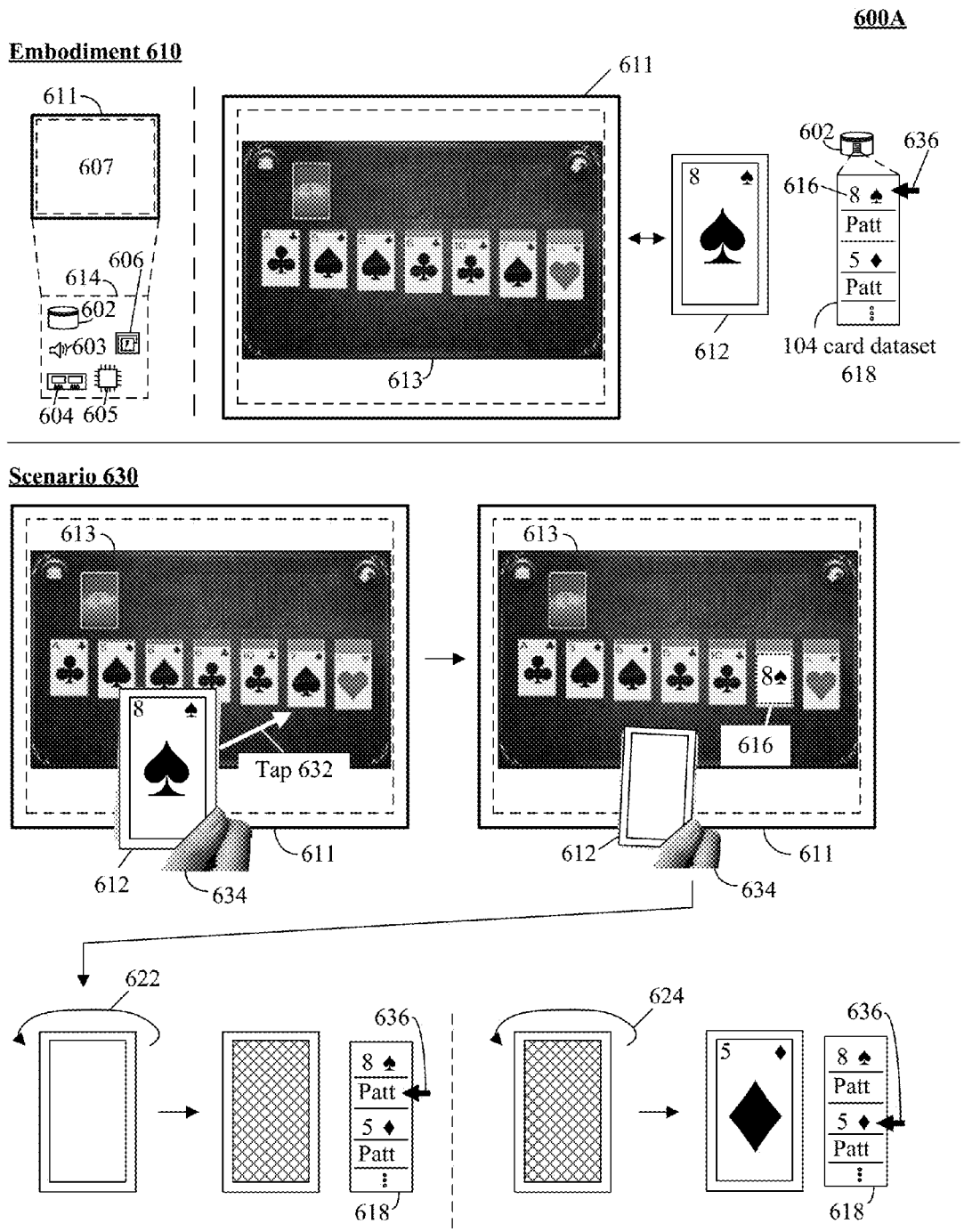
FIG. 6A is a schematic diagram illustrating an embodiment and a scenario 630 for presenting elements from an ordered dataset within a graphical user interface of a multi-sided polyhedron responsive to the rotation of the polyhedron in accordance with an embodiment of the inventive arrangements disclosed herein.

FIG. 6A is a schematic diagram illustrating an embodiment 610 and a scenario 630 for presenting elements from an ordered dataset within a graphical user interface of a multi-sided polyhedron responsive to the rotation of the polyhedron in accordance with an embodiment of the inventive arrangements disclosed herein. Embodiment 610, scenario 630, can be present in the context of embodiment 101, scenario 110, 160 embodiment 201, scenario 210, 260, embodiment 310, 401, 510, embodiment 650, 710, 760, 810, 850, system 890, embodiment 910, 930, 950, 1010, system 1100, and/or method 1200.

In embodiment 610, a multi-sided polyhedron having two or more displays can conform to an electronic game board 611 format. In the embodiment, game board 611 can include internal components 614 (e.g., 602-606) and two or more displays 607. In one instance, board 611 can present one or more game content 613 associated with a game. In the instance, content 613 can be a digitally rendered graphic of a card game, traditional board game (e.g., chess), proprietary board game (e.g., CLUE), and the like. For example, display 607 can present a Solitaire card game "board" permitting a player to play a game of Solitaire with traditional playing cards.

In one embodiment, board 611 can present content from an online game (e.g., MAGIC THE GATHERING ONLINE), a computer game (e.g., MINESWEEPER, HEARTS), and the like.

In one instance, board 611 can be associated with a game data including, but not limited to, game rules, game graphics, playable game area mapping information, non-playable game area mapping information, and the like. For example, board 611 can present one or more game boards with tokens representing one or more players within display 607. It should be appreciated that board 611 can be flexible (e.g., OLED), foldable, and the like. In one instance, board 611 can be include a rollable electrophoretic ink display, internal components which can be communicatively linked to one or more computing devices polyhedrons, and/or data stores.

In one embodiment, board 611 can be associated with one or more data structures including, but not limited to, a stack, a queue, a linked list, a set, an ordered dataset, a class, an object, and the like. For example, one or more stacks can be utilized to permit a Solitaire game where cards are stacked on top of each other in a last-in-first-out manner.

In one instance, one or more additional multi-sided polyhedron 612 can be communicatively linked to board 611. In the instance, board 611 and polyhedron 612 can interact in real-time or near real-time. For example, polyhedron 612 can function as a playing card which can allow a player (e.g., 634) to play a game of Solitaire using polyhedron 612 and board 611. In one embodiment, a 104 card dataset 618 can be associated with polyhedron 612 and/or game board 611 enabling polyhedron 612 and/or game board 611 to present one or more playing card graphics from a 52 card deck. In the embodiment, elements within dataset 618 stored within data store 602 can be presented during gameplay associated with board 611 and/or polyhedron 612. It should be appreciated that dataset 618 can be automatically and/or manually randomized prior to gameplay. For example, as a player rotates polyhedron an appropriate card from dataset 618 can be presented which can be "placed" on board 611.

In scenario 630, a player 634 can utilize polyhedron 612 to interact with content 613 of board 611. In one embodiment, when a tap 632 gesture is performed with polyhedron 613 the element presented within polyhedron 612 can be presented within content 613. For example, element presented within polyhedron 612 can be transmitted to board 611 when player 634 taps polyhedron 612 (e.g., eight of spades) onto an appropriate card (e.g., seven of spades), the element 636 (e.g., eight of spades) can be presented on board 611 as content 616. It should be appreciated that the disclosure is not limited to gestures and can include any traditional and/or proprietary mechanisms for interaction between computing devices.

In one instance, polyhedron 612 can present the next element (e.g., back of card pattern) within dataset 618 responsive to successful placement of a card (e.g., element 636) onto board 611. In another instance, after a successful placement of a card (e.g., element 636) onto board 611, polyhedron 612 can appear blank. When polyhedron 612 is rotated 622, the next element 636 within dataset 618 can be presented (e.g., back of card pattern). Polyhedron 612 can be rotated 624 which can advance dataset 618 pointer to the next element 636 (e.g., five of diamonds) which can be presented.

Figure 6B:
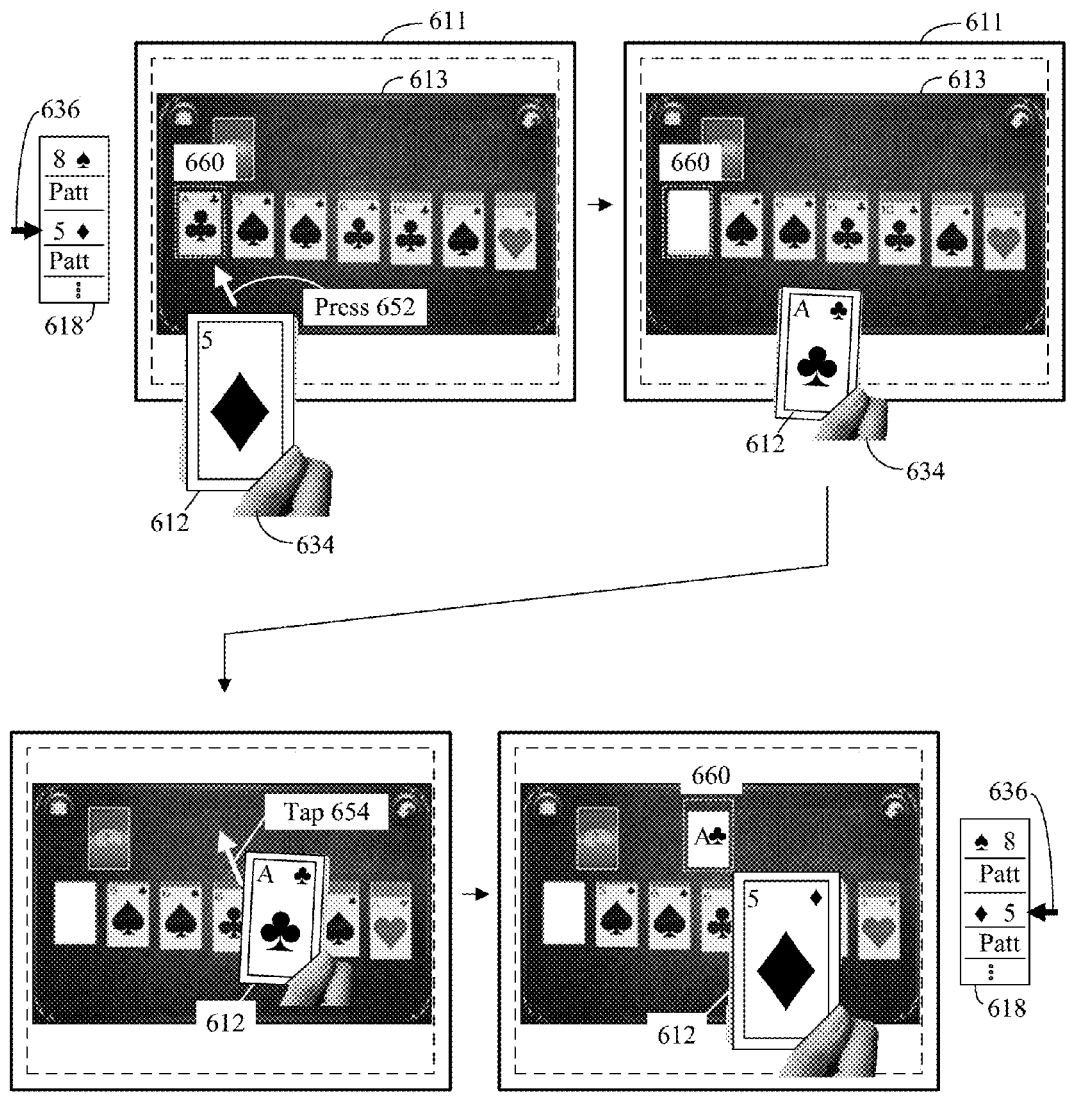
FIG. 6B is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.

FIG. 6B is a schematic diagram illustrating an embodiment 650 for presenting elements from an ordered dataset within a graphical user interface of a multi-sided polyhedron responsive to the rotation of the polyhedron in accordance with an embodiment of the inventive arrangements disclosed herein. Embodiment 650 can be present in the context of embodiment 101, scenario 110, 160 embodiment 201, scenario 210, 260, embodiment 310, 401, 510, 610, scenario 630, 710, 760, 810, 850, system 890, embodiment 910, 930, 950, 1010, system 1100, and/or method 1200.

In embodiment 650, a press 652 interaction pattern can permit select of content 660 within board 611. In the embodiment, polyhedron 612 can present element 636 from ordered dataset 618. Player 634 can perform a press 652 gesture upon content 660 which can trigger content 660 to be presented within polyhedron 612. For example, player 634 can "pick up" the ace of clubs from the game board 611 when a press and hold gesture is performed on content 660. That is, the five of diamonds presented within polyhedron 612 can be temporarily replaced with ace of clubs. In one instance, the press and hold gesture 652 can insert content 660 within dataset 618. In the instance, content 660 can be inserted prior to content 636 enabling the content 636 to be presented when content 660 is removed (e.g., pointer is advanced to next element). When the content 660 is presented within polyhedron 612, content 613 can be updated to remove content 660 from being presented within board 611. In one embodiment, when player 634 taps 654 game board 611, content 660 can be placed appropriately. For example, when player 634 taps the board 611, the ace of clubs can be placed within the first home slot of the game board. In the embodiment, polyhedron 612 can present the appropriate element 636 when content 660 is presented within board 611. For example, polyhedron 612 can present the five of diamonds when the ace of clubs is placed on the board.

Figure 7A:
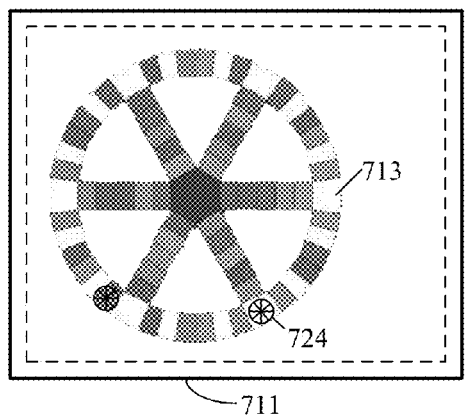
FIG. 7A is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.
Figure 7A:
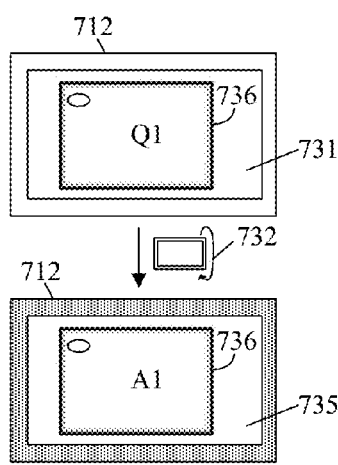
Figure 7A:
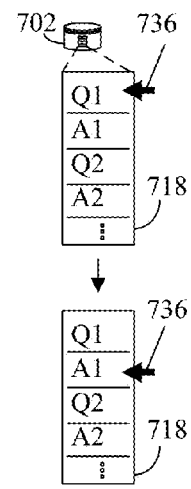
Figure 7A:
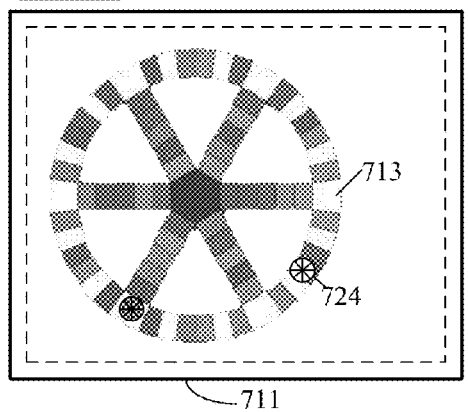
Figure 7A:
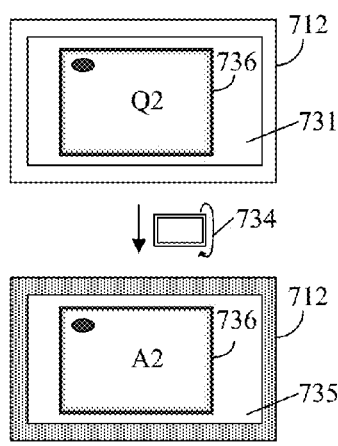
Figure 7A:
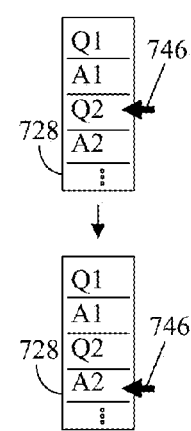
Figure 7A:
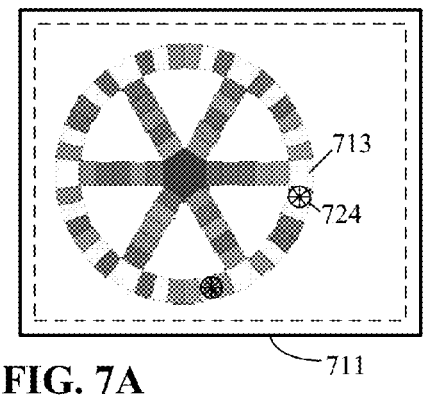
Figure 7A:
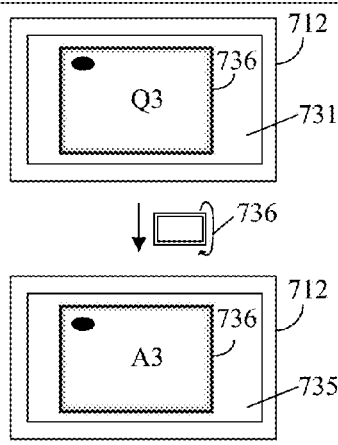
Figure 7A:
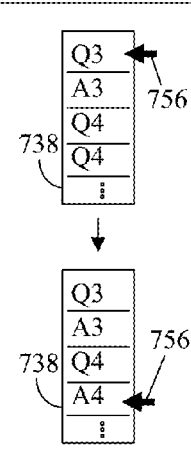

FIG. 7A is a schematic diagram illustrating an embodiment 710 for presenting elements from an ordered dataset within a graphical user interface of a multi-sided polyhedron responsive to the rotation of the polyhedron in accordance with an embodiment of the inventive arrangements disclosed herein. Embodiment 710 can be present in the context of embodiment 101, scenario 110, 160 embodiment 201, scenario 210, 260, embodiment 310, 401, 510, 610, scenario 630, embodiment 650, 760, 810, 850, system 890, embodiment 910, 930, 950, 1010, system 1100, and/or method 1200.

In embodiment 710, a multi-sided polyhedron having two or more displays can conform to an electronic game board 711 format. In the embodiment, game board 711 can include internal components (e.g., processor, bus, memory) and two or more displays. In one instance, board 711 can present one or more game content 713 associated with a game. In the instance, content 713 can be a digitally rendered graphic of a card game, traditional board game (e.g., chess), proprietary board game (e.g., CLUE), and the like. For example, the display of board 711 can present a TRIVIAL PURSUIT game board permitting a player to play a game of TRIVIAL PURSUIT with traditional playing cards. In one instance, board 711 can be associated with a game data including, but not limited to, game rules, game graphics, playable game area mapping information, non-playable game area mapping information, and the like. For example, board 711 can present one or more game boards with tokens representing one or more players within the display of the board 711.

In one embodiment, board 711 can be associated with one or more data structures including, but not limited to, a stack, a queue, a linked list, a set, an ordered dataset, a class, an object, and the like. In one instance, one or more sets can be utilized to permit a TRIVIAL PURSUIT game to be played where multiple different categories of cards are selected based on token position in the game board. For example, six ordered datasets can be persisted within a data store, where each dataset can include question and answers for each category of questions/answers (e.g., Geography, Entertainment, History, Arts & Literature, Science & Nature, and Sports & Leisure. That is, six question banks can store all the relevant questions and answers for a TRIVIAL PURSUIT game.

In one instance, one or more additional multi-sided polyhedron 712 can be communicatively linked to board 711. In the instance, board 711 and polyhedron 712 can interact in real-time or near real-time. For example, polyhedron 712 can function as a question and answer card which can allow a player to play a game of TRIVIAL PURSUIT using polyhedron 712 and board 711. In one embodiment, a dataset 718 can be associated with polyhedron 712 and/or game board 711 enabling polyhedron 712 and/or game board 711 to present one or more questions and/or answers from a relevant category. In the embodiment, elements within dataset 718 stored within data store 702 can be presented during gameplay associated with board 711 and/or polyhedron 712. It should be appreciated that dataset 718 can be automatically and/or manually randomized prior to gameplay.

In one instance, player token 724 can be associated with a player enabling appropriate selection of card based on game content 713 (e.g., board) location. For example, when token 724 is present on a yellow space (e.g., turn 704), a question associated with the History category (e.g., yellow) can be presented within a user facing display 731 of polyhedron 712. That is, an appropriate question 736 can be presented from ordered dataset 718 based on token 724 location. When polyhedron 712 is rotated 732, an appropriate answer 736 from dataset 718 can be presented within a user facing display 735 of polyhedron 712. That is, the rotation 732 can trigger a subsequent element within the ordered dataset to be presented.

In turn 705, when player token 724 is present on a different portion of content 713 (e.g., board space) an appropriate question 746 can be presented from an ordered dataset 728. For example, when token 724 is present on a blue space (e.g., Geography), a question associated with the Geography category can be presented within a user facing display 731 of polyhedron 712. That is, an appropriate question 746 can be presented from ordered dataset 728 based on token 724 location. When polyhedron 712 is rotated 734, an appropriate answer 746 from dataset 728 can be presented within a user facing display 735 of polyhedron 712. That is, the rotation 734 can trigger a subsequent element within the ordered dataset to be presented.

In turn 706, when player token 724 is present on a different portion of content 713 (e.g., board space) an appropriate question 756 can be presented from an ordered dataset 738. For example, when token 724 is present on an orange space (e.g., Sports & Leisure), a question associated with the Sports & Leisure category can be presented within a user facing display 731 of polyhedron 712. That is, an appropriate question 756 can be presented from ordered dataset 738 based on token 724 location. When polyhedron 712 is rotated 734, an appropriate answer 756 from dataset 738 can be presented within a user facing display 735 of polyhedron 712. That is, the rotation 734 can trigger a subsequent element within the ordered dataset to be presented.

Figure 7B:
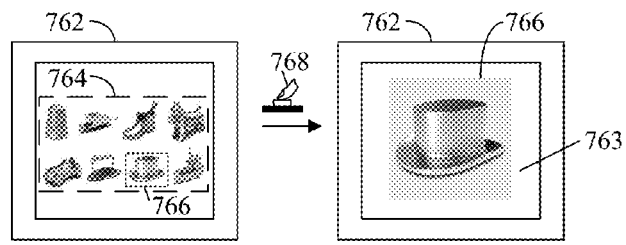
FIG. 7B is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.
Figure 7B:
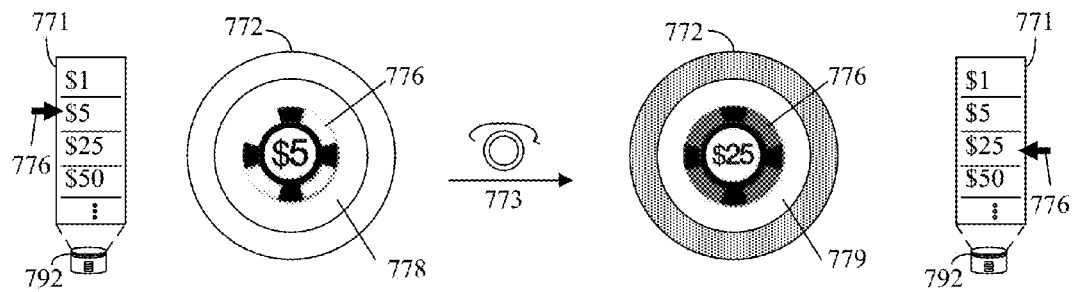

FIG. 7B is a schematic diagram illustrating an embodiment 760 for presenting elements from an ordered dataset within a graphical user interface of a multi-sided polyhedron responsive to the rotation of the polyhedron in accordance with an embodiment of the inventive arrangements disclosed herein. Embodiment 760 can be present in the context of embodiment 101, scenario 110, 160 embodiment 201, scenario 210, 260, embodiment 310, 401, 510, 610, scenario 630, embodiment 650, 710, 810, 850, system 890, embodiment 910, 930, 950, 1010, system 1100, and/or method 1200.

Embodiments 760, 770 illustrate different form factors for the multi-sided polyhedron with two or more displays. Form factors can include, but is not limited to, square formats, round formats (e.g., poker chips), and the like.

In embodiment 760, multi-sided polyhedron 762 can be utilized to select one or more player tokens associated with a game. For example, polyhedron 762 can present a content 764 which can include a set of MONOPOLY tokens. It should be appreciated that set within content 764 can be an M ordered dataset. In one instance, selection 768 of an element 766 within content 764 can trigger the content 766 to be presented within a user facing display 763 of polyhedron 762. For example, a user can select a top hat token within a touch screen display of polyhedron 762 to select the top hat token as their choice. It should be appreciated that polyhedron 762 can present any arbitrary content which can include game accessories (e.g., MONOPOLY HOTELS), player avatars, figurines (e.g., SKYLANDERS, WARHAMMER 40K, HEROCLIX), game currency, and the like.

In embodiment 770, multi-sided polyhedron 772 can represent non-negotiable funds associated with a game. In one configuration of the embodiment, an M ordered dataset 771 can be stored within a data store 792. Dataset 771 can include an element 776 which can be presented within a user facing display 778. For example, polyhedron 772 can present a poker chip graphic (e.g., element 776) with a five dollar value within a user facing display 778. When polyhedron is rotated 773, a subsequent element within dataset 771 can be presented within a user facing display 779. For example, when a player flips the chip over, a poker chip graphic (e.g., element 776) with a twenty five dollar value can be presented within display 779.

Figure 8A:
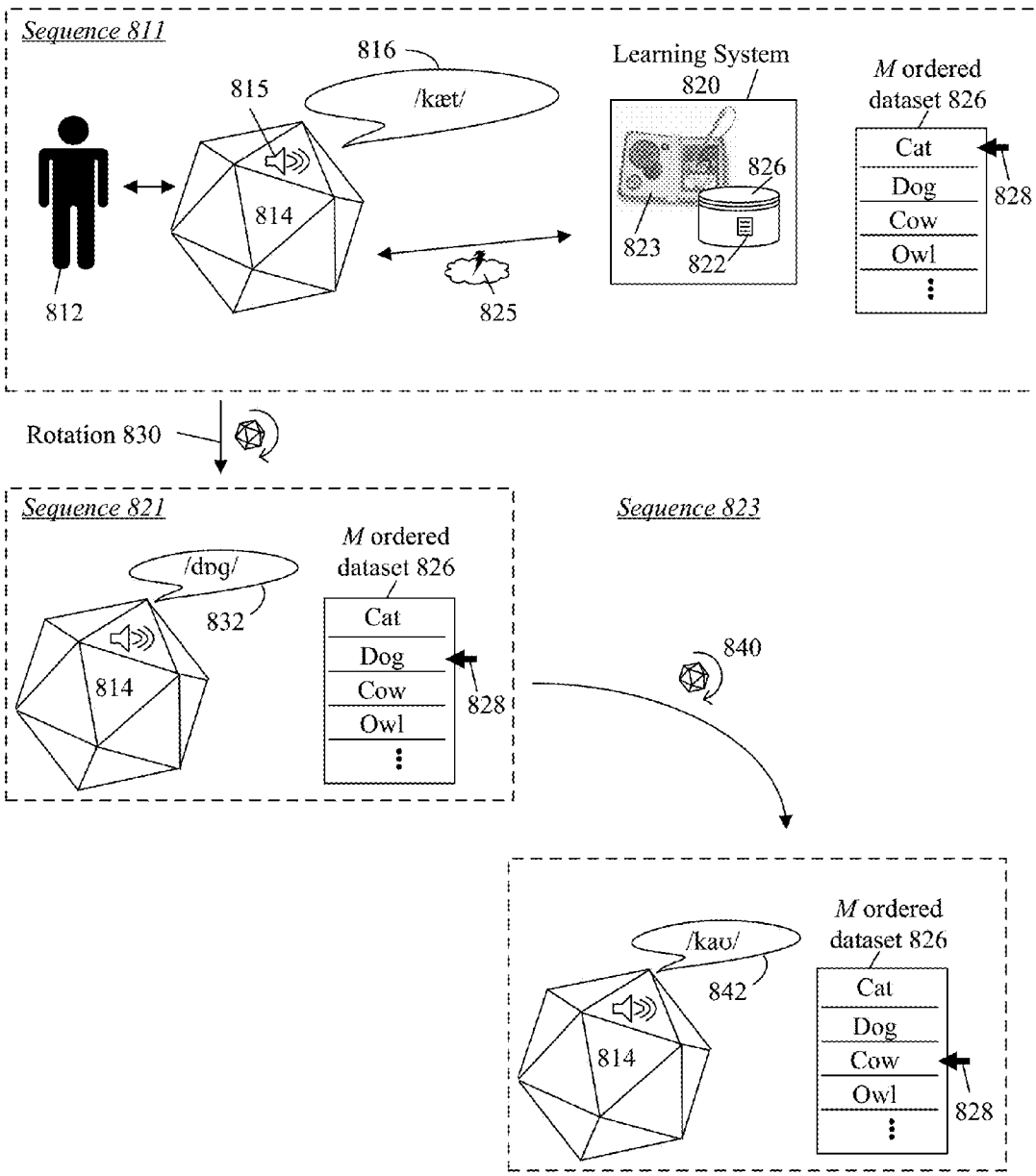
FIG. 8A is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.

FIG. 8A is a schematic diagram illustrating an embodiment 810 for presenting elements from an ordered dataset within a graphical user interface of a multi-sided polyhedron responsive to the rotation of the polyhedron in accordance with an embodiment of the inventive arrangements disclosed herein. Embodiment 810 can be present in the context of embodiment 101, scenario 110, 160 embodiment 201, scenario 210, 260, embodiment 310, 401, 510, 610, scenario 630, embodiment 650, 710, 760, 850, system 890, embodiment 910, 930, 950, 1010, system 1100, and/or method 1200.

In embodiment 810, a multi-sided polyhedron 814 with two or more displays can be communicatively linked to one or more learning systems 820. In one instance, polyhedron 814 can be communicatively linked via one or more wired and/or wireless networks 825. For example, polyhedron 814 can be linked via a WiFi network to a laptop computer presenting a language learning content (e.g., vocabulary of a foreign language) within a Web browser. It should be appreciated that the disclosure is not limited to a learning system and can be communicatively linked to any data handling system.

As used herein, learning system 820 can be one or more computing entities configured to receive, convey, and or present learning content. For example, system 820 can be a handheld learning tool such as a FISHERPRICE iXL device. Learning content can be one or more data sets associated with a system used to instruct and/or inform. Content can include, but is not limited to, an alphabet, phonics, basic math, and the like. For example, content can be a science fact database for teaching children basic science principles. Learning system 820 can be associated with, one or more computing devices 823, a data store 822, and the like. In one instance, data store 822 can persist an M ordered dataset 826 of learning content. For example, data store 822 can persist a set of vocabulary words for teaching English.

System 820 can include, but is not limited to, learning management systems, educational systems (e.g., video games), and the like. In one instance, system 820 can be one or more educational handheld game consoles. For example, system 820 can be a LEAPSTER LEARNING GAME SYSTEM. It should be appreciated that system 820 can include, but is not limited to, e-learning systems, educational video game systems, educational toys (e.g., SPEAK AND SPELL), and the like. For example, learning system 820 can be a LEAPFROG LEAPPAD device, VTECH MOBIGO device, or LEARNING RESOURCES RADIUS AUDIO LEARNING SYSTEM educational device. It should be appreciated that system 820 can be associated with removable media (e.g., SD card, cartridges) which can include software, applications, and/or a dataset (e.g., M ordered dataset 826). In one embodiment, polyhedron 814 can include the requisite hardware/software to interface with removable media. For example, an SD card with an arithmetic content can be inserted into an SD card slot of polyhedron 814 enabling polyhedron 814 to present the content stored on SD card.

In sequence 811, a user can interact with a multi-sided polyhedron 814. System 820 can convey element 828 to polyhedron 814. Polyhedron 814 can present element 8282 to user 812. For example, polyhedron 814 can include a loudspeaker which can pronounce the word "cat", allowing the user 812 to hear and/or repeat the word. It should be appreciated that polyhedron 814 can include the necessary internal components to perform the functionality described herein.

When a rotation 830 is performed by user 812 and polyhedron 814 is rotated, a subsequent element within dataset 826 can be presented. For example, when user rotates polyhedron 814, a pronunciation for the word "dog" can be presented (e.g., element 828).

When a rotation 840 is performed by user 812 and polyhedron 814 is rotated, a subsequent element within dataset 826 can be presented. For example, when user rotates polyhedron 814, a pronunciation for the word "cow" can be presented (e.g., element 828).

Figure 8B:
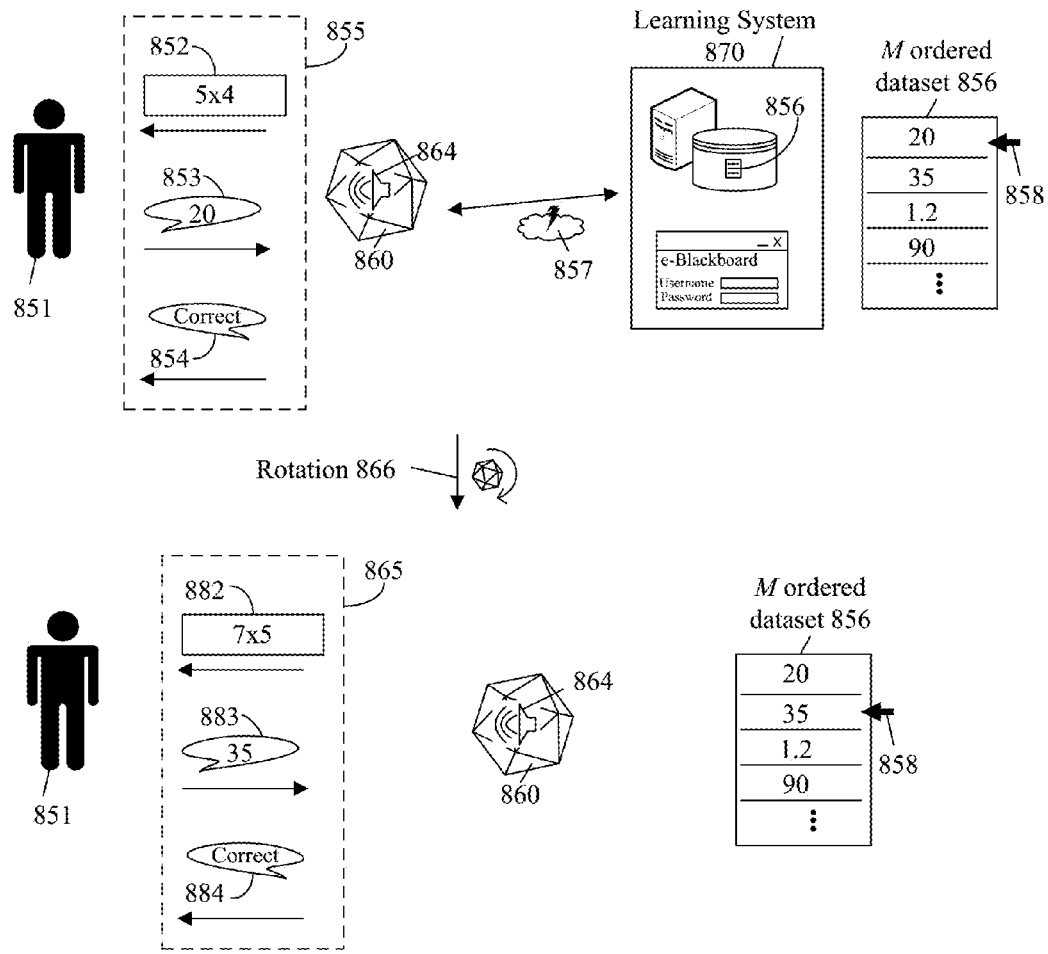
FIG. 8B is a schematic diagram illustrating a set of embodiments for presenting elements from an ordered dataset within a graphical user interface of a multi-sided polyhedron responsive to the rotation of the polyhedron in accordance with an embodiment of the inventive arrangements disclosed herein.
Figure 8B:
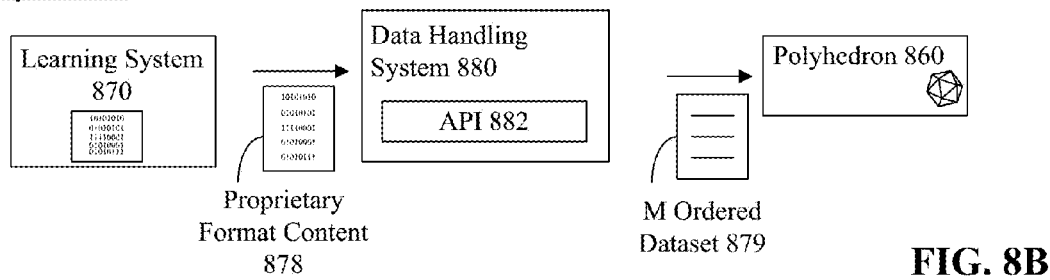

FIG. 8B is a schematic diagram illustrating an embodiment 850 and a system 890 for presenting elements from an ordered dataset within a graphical user interface of a multi-sided polyhedron responsive to the rotation of the polyhedron in accordance with an embodiment of the inventive arrangements disclosed herein. Embodiment 850 and system 890 can be present in the context of embodiment 101, scenario 110, 160 embodiment 201, scenario 210, 260, embodiment 310, 401, 510, 610, scenario 630, embodiment 650, 710, 760, 810, embodiment 910, 930, 950, 1010, system 1100, and/or method 1200.

In embodiment 850, a user 815 can interact 855 with a multi-sided polyhedron 860 communicatively linked to a learning system 870 via one or more networks 857. In one instance, system 870 can include one or more ordered datasets 856. In one configuration of the instance, system 870 can be an electronic blackboard learning system (e.g., BLACKBOARD). In one embodiment, interaction 855 can include prompt, 852 and input 853, and a confirmation 854. In the embodiment, loudspeaker 864 can be utilized to present prompt 852 (e.g., question). In the embodiment, user 851 can respond with input 853 (e.g., appropriate answer) which can be received by one or more input components (e.g., microphone) within polyhedron 860. In the embodiment, the input 853 can be evaluated (e.g., speech to text and text matching) to determine if the answer 853 matches the current element 858 of the ordered dataset 856. When the input 853 matches the current element 858 of dataset 856, an appropriate confirmation 854 can be presented (e.g., via loudspeaker, LED notification, etc). For example, when the user 851 successfully answers the question "5 times 4" with the answer "20", the polyhedron 860 can convey a "correct" notification. It should be appreciated that polyhedron 860 can utilize one or more resources of learning system 870 and/or a computing device to enable the interaction 855.

When rotation 866 occurs and polyhedron 860 is rotated, a different interaction can be triggered 865. For example, when user 851 rotates polyhedron 851 to the right, a new question 882 can be presented. When question is presented and a user 851 input 883 is received, the polyhedron 850 (e.g., and/or communicatively linked systems) can evaluate the input. When input 833 matches element 858 of dataset 856, an appropriate confirmation 884 can be presented. For example, when the user 851 successfully answers the question "7×5" with the answer "35", the polyhedron 860 can convey a "correct" notification.

System 890 illustrates an organized set of components for permitting interaction between proprietary formatted content 878 and polyhedron 860. In one instance, learning system 870 can include proprietary formatted content 878 which can be conveyed to data handling system 880. One or more application programming interfaces (APIs) can extract relevant data, metadata, and the like from content 878. It should be appreciated that APIs can convert, extract (e.g., export), import content 878, and the like. In one instance, content 878 can be converted to an M ordered dataset 879. In the instance, the dataset 879 can be conveyed to polyhedron 860 enabling polyhedron 860 to present content 878.

Drawings presented herein are for illustrative purposes only and should not be construed to limit the invention in any regard. In one embodiment, system 880 can be a component of system 870, polyhedron 860, a communicatively linked independent system, and the like.

Figure 9A:
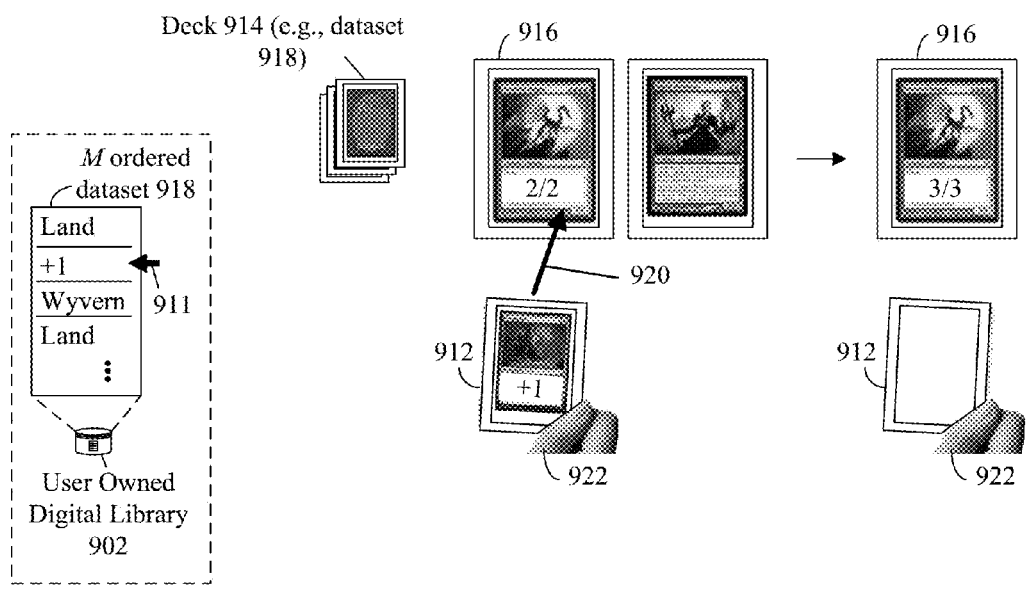
FIG. 9A is a schematic diagram illustrating a set of embodiments for presenting elements from an ordered dataset within a graphical user interface of a multi-sided polyhedron responsive to the rotation of the polyhedron in accordance with an embodiment of the inventive arrangements disclosed herein.
Figure 9A:
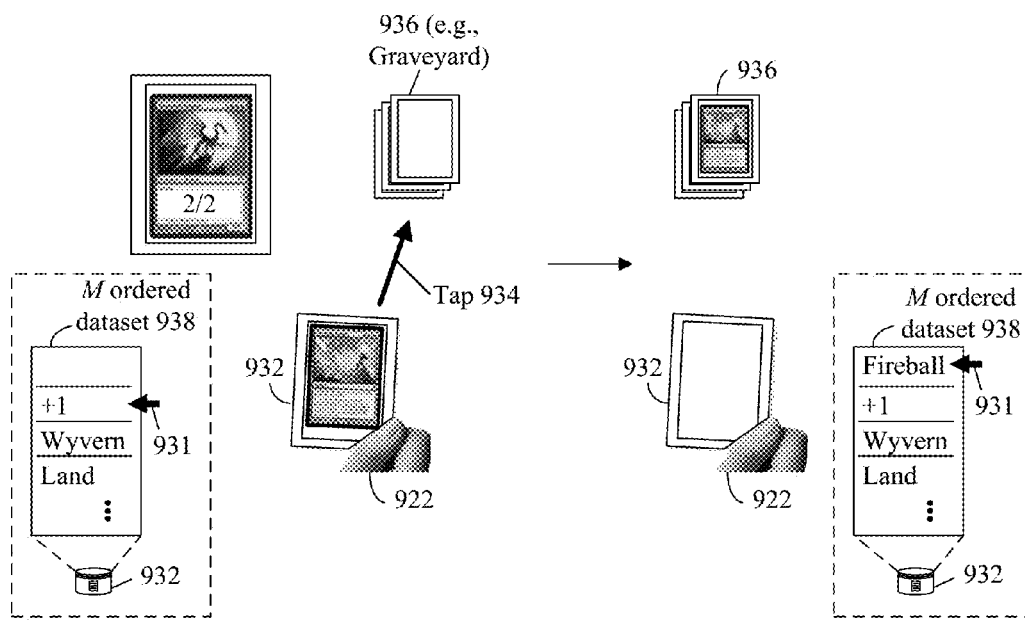

FIG. 9A is a schematic diagram illustrating a set of embodiments 910, 930 for presenting elements from an ordered dataset within a graphical user interface of a multi-sided polyhedron responsive to the rotation of the polyhedron in accordance with an embodiment of the inventive arrangements disclosed herein. Embodiment 910, 930 can be present in the context of embodiment 101, scenario 110, 160 embodiment 201, scenario 210, 260, embodiment 310, 401, 510, 610, scenario 630, embodiment 650, 710, 760, 810, 850, system 890, embodiment 950, 1010, system 1100, and/or method 1200.

In embodiment 910, a user owned digital library 902 can include an M ordered dataset 918. M ordered dataset 918 can include elements which can represent a user owned digital library and/or shared library (e.g., non-user owned content). Each element of dataset 918 can represent one or more MAGIC THE GATHERING playing cards. In one instance, elements of dataset 918 can be linked to graphics of MAGIC THE GATHERING playing cards, flavor text, thumbnail, rules associated with the card and/or gameplay, stat information, card metadata (e.g., rarity), and the like. That is, the embodiment 910 can be easily implemented to permit the use of other collectible trading card games including, but not limited to, YU-GI-OH, BLIZZARD HEARTHSTONE, MARVEL TRADING CARD GAME, DIGIMON, and the like.

In one instance, M ordered dataset 918 can include MAGIC THE GATHERING playing cards that a player 922 has purchased (e.g., e-store, brick and mortar, trading). It should be appreciated that digital library 902 can include digital content of real world counterparts (e.g., MAGIC THE GATHERING playing cards). For example, dataset 918 can include a unique or rare MAGIC THE GATHERING playing card that a user purchased in store.

In one instance, a deck 914 can include one or more multi-sided polyhedrons with two or more displays. Deck 914 can include multiple polyhedrons 914 able to present one or more elements 911 from ordered dataset 918. That is, deck 914 can represent a set or subset of available cards owned by a user. For example, deck 914 can be a subset of red cards and land cards of the library 902. In one instance, library 902 can include multiple sets which can represent user established organizations (e.g., decks).

In embodiment 910, a player 922 can hold a polyhedron 912 which can present an element 911 within a user facing display. It should be appreciated that the non-user facing display can present the back of a MAGIC THE GATHERING playing card appropriate for the element displayed or any other appropriate graphic. In embodiment 910, 930, near field communication (NFC) technology can be leveraged to enable seamless gameplay with one or more polyhedrons 912.

In one instance, when player 922 taps a polyhedron 916 with a polyhedron 912, the attributes of the element can trigger content presented within polyhedron 916 to be updated. For example, when player 922 applies a +1 bonus to a 2/2 creature (e.g., content within 916) by tapping on the polyhedron 916 with polyhedron 912, the creature stats can be updated to 3/3. In one embodiment, polyhedron 912 user facing display can be blank. For example, the blank display can emulate placing the card into the graveyard after the card has been played. In another embodiment, polyhedron 912 can remain unchanged (e.g., element 911 is presented) until a different player 922 action is performed.

In embodiment 930, a player 922 can hold a polyhedron 932 which can present an element 931 within a user facing display. It should be appreciated that the non-user facing display can present the back of a MAGIC THE GATHERING playing card appropriate for the element displayed or any other appropriate graphic.

In one instance, when player 922 taps a polyhedron 936 with a polyhedron 932, the element can be presented within polyhedron 936. For example, when player 922 discards a card in hand (e.g., content within 932) to the graveyard by tapping on the polyhedron 936 with polyhedron 932, the card in hand can be placed on the top of the stack of the graveyard 936. In one embodiment, polyhedron 932 user facing display can be blank. For example, the blank display can emulate placing the card into the graveyard where no card is present in player's 922 hand. In another embodiment, polyhedron 912 can remain unchanged (e.g., element 931 is presented) until a different player 922 action is performed. In one instance, tap 934 can trigger dataset 938 to be updated appropriately. For example, when the card (e.g., fireball card) presented in polyhedron 932 is used and placed on the graveyard (e.g., tap 934), the dataset 938 can be updated to include the card (e.g., fireball card) within dataset 938. It should be appreciated that dataset 938 can be modified in any arbitrary way including, element addition, element removal, element reordering, set duplication, set splitting, and the like.

It should be appreciated that embodiment 910, 930 can be performed with one polyhedron 932 and an electronic game board (e.g., polyhedron 611). In one embodiment, polyhedron 932 and a companion computing device (e.g., tablet computer, electronic game board) can permit a player to interact with another player using a computer. In one use case, two players can play a MAGIC THE GATHERING game by sharing a tablet computing device. The player 922 can use polyhedron 912 to play cards onto a virtual tabletop within an interface of the tablet computing device. The other player can play cards by interacting with the interface of the tablet computing device. That is, the disclosure can support multi-modal gameplay where each player can interact differently to perform the same actions.

Drawings presented herein are for illustrative purposes only and should not be construed to limit the invention in any regard. It should be appreciated that the disclosure can permit traditional card game actions including, but not limited to, drawing a card, discarding a card, tapping a card, shuffling a set of cards, and the like. In one instance, polyhedron 912, 932 can act as a counter for one or more game elements (e.g., cards, player life, etc.) For example, polyhedron 912, 932 can present a set of temporary 1/1 creatures conjured by a card played by player 922. In one instance, counters within polyhedron 912, 932 can be updated utilizing traditional and/or proprietary methods, including, but not limited to, touch, sliding, rotation, and the like. For example, an ordered dataset of increasing numeric values can be utilized to represent a counter, where rotating the polyhedron 912, 932 clockwise can increase the counter (e.g., advance the pointer of the set forward) and rotating the polyhedron 912, 932 counter-clockwise can decrease the counter (e.g., moving the pointer of the set backward).

Figure 9B:
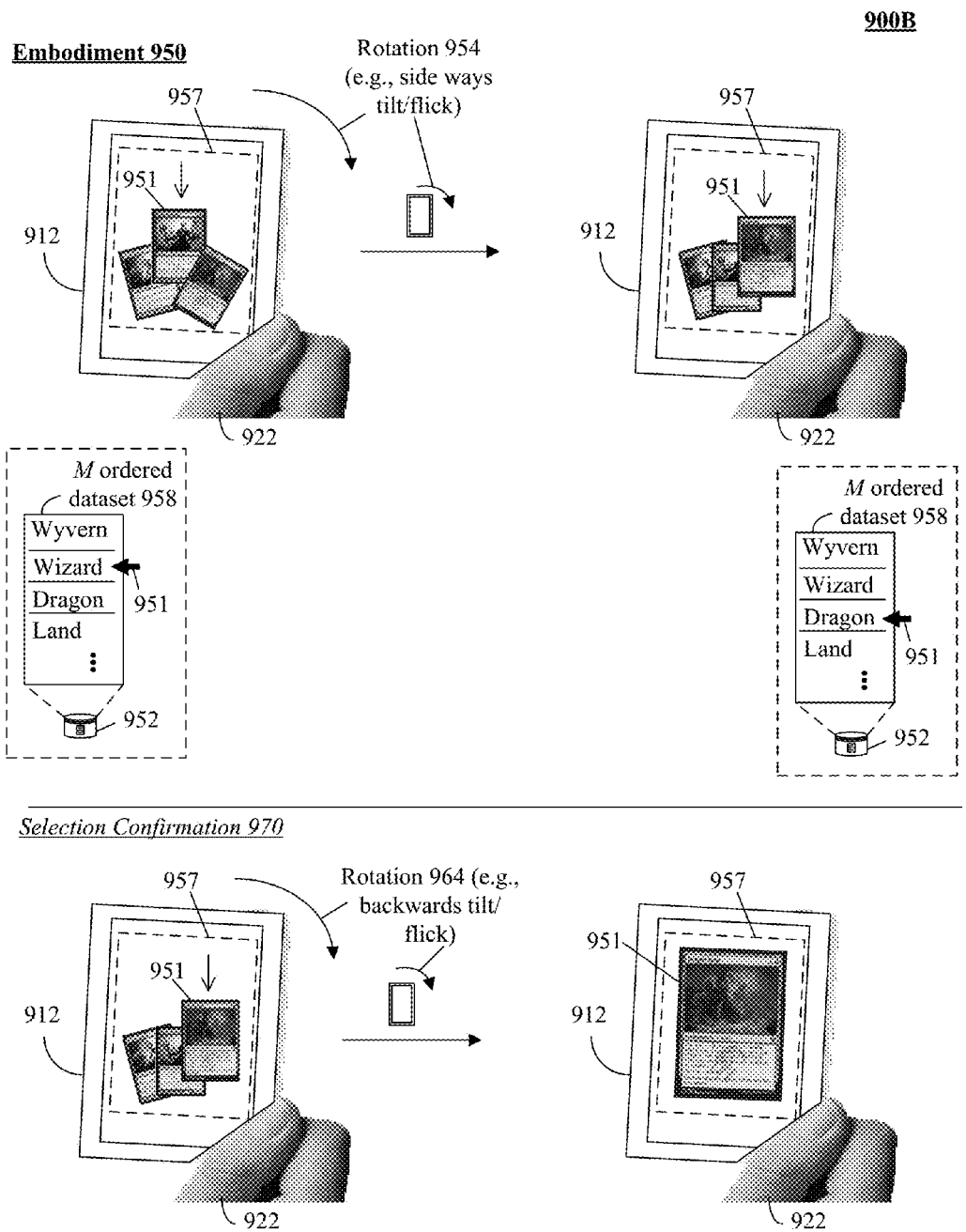
FIG. 9B is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.

FIG. 9B is a schematic diagram illustrating an embodiment 950 for presenting elements from an ordered dataset within a graphical user interface of a multi-sided polyhedron responsive to the rotation of the polyhedron in accordance with an embodiment of the inventive arrangements disclosed herein. Embodiment 950 can be present in the context of embodiment 101, scenario 110, 160 embodiment 201, scenario 210, 260, embodiment 310, 401, 510, 610, scenario 630, embodiment 650, 710, 760, 810, 850, system 890, embodiment 910, 930, 1010, system 1100, and/or method 1200.

Embodiment 950 illustrates an interface 957 for presenting multiple elements from an M ordered dataset 958 stored within a data store 952. In one instance, interface 957 can permit navigation through one or more elements of dataset 958 via rotation 954. It should be appreciated that interface 957 is for illustrative purposes only and should not be construed to limit the invention in any regard. In one embodiment, interface 957 can present elements within any arbitrary arrangement including, but not limited to, a grid, tiles, freeform, and the like.

In embodiment 950, a multi-sided polyhedron 912 with two or more displays can present an interface 957 within a user facing display. Interface 957 can present a set or subset of elements from ordered dataset 958. Each element 951 within the dataset 958 can represent a card which a player can utilize. For example, interface 957 can present a set of cards (e.g., thumbnails of Wyvern, Wizard, Dragon cards) which a player 922 holds in their hand. In one embodiment, navigation to an element 951 within interface 957 can be performed utilizing a rotation 954. In the embodiment, rotation 954 can permit quick traversal through the dataset 958. For example, when a player 922 tilts polyhedron 912 to the right, a pointer associated with the dataset can be advanced once showing the next card (e.g., Dragon card). In one instance, interface 957 can emphasize the current element 951 being presented by distinguishing the element from adjacent elements. For example, the current card can be positioned higher and larger than adjacent cards when the card is currently selected.

In selection confirmation 970, a rotation 964 can trigger selected element (e.g., card) to be enlarged and solely presented. For example, when player 922 tilts polyhedron 912 towards themselves, the selected card (e.g., Dragon) can be chosen and presented (e.g., in full size) in the user facing display by itself.

Figure 10:
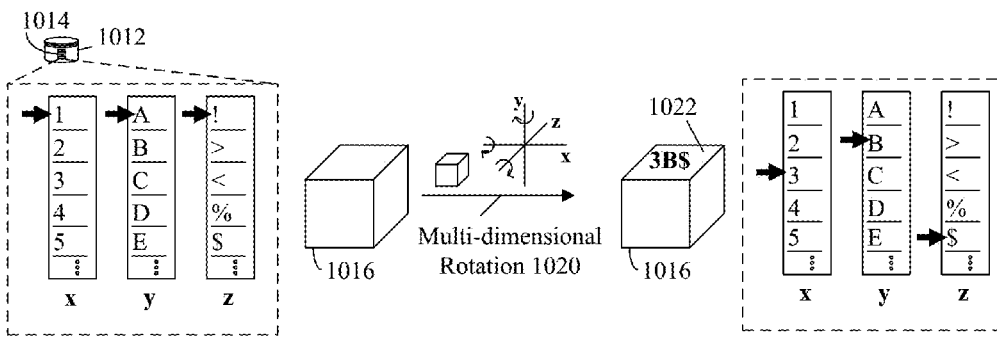
FIG. 10 is a schematic diagram illustrating an embodiment for presenting elements from an ordered dataset within a graphical user interface of a multi-sided polyhedron responsive to the rotation of the polyhedron in accordance with an embodiment of the inventive arrangements disclosed herein.
Figure 10:
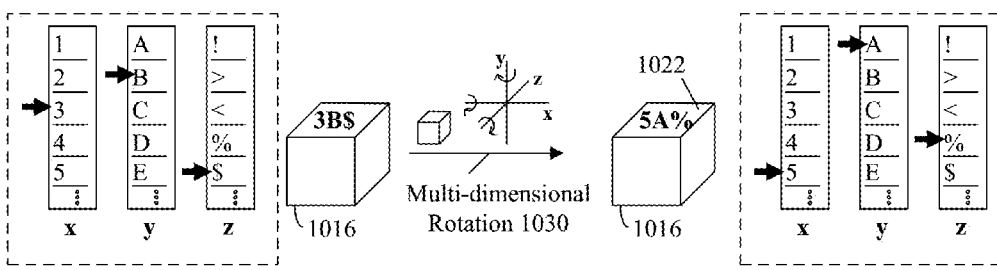
Figure 10:
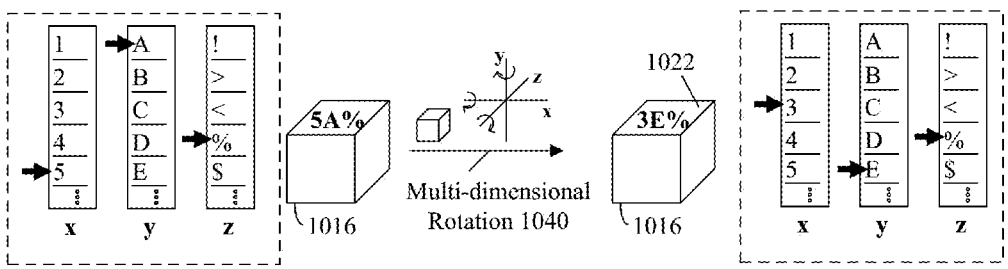

FIG. 10 is a schematic diagram illustrating an embodiment 1010 for presenting elements from an ordered dataset within a graphical user interface of a multi-sided polyhedron responsive to the rotation of the polyhedron in accordance with an embodiment of the inventive arrangements disclosed herein. Embodiment 1010 can be present in the context of embodiment 101, scenario 110, 160 embodiment 201, scenario 210, 260, embodiment 310, 401, 510, 610, scenario 630, embodiment 650, 710, 760, 810, 850, system 890, embodiment 910, 930, 950, system 1100, and/or method 1200.

In embodiment 1010, a data store 1012 can persist three M ordered datasets 1014. In one instance each M ordered dataset 1014 can include elements which can be presented within a multi-sided polyhedron 1016. Multi-sided polyhedron 1016 can include two or more displays which can present one element from each of the three datasets 1014 within a user facing display. For example, datasets 1014 can be a multi-dimensional relational data structure.

In the embodiment, each of the M ordered datasets 1014 can be associated with an axis of rotation of the polyhedron 1016. For example, the first M ordered dataset can be associated with a rotation around the x-axis, the second M ordered dataset can be associated with a rotation around the y-axis and the third M ordered dataset can be associated with a rotation around the z-axis. When polyhedron 1016 is affected by multi-dimensional rotation 1020, pointers associated with each of the three dataset can be advanced accordingly. For example, polyhedron 1016 can rotated three times around the x-axis which can advance the pointer of the dataset associated with the x-axis to the element "3", two times around the y-axis which can advance the pointer of the dataset associated with the y-axis to the element "B", and five times around the z-axis which can advance the pointer of the dataset associated with the z-axis to the element "$". When the polyhedron 1016 stops rotating, each of the elements can be presented within a user facing display of the polyhedron 1016. For example, polyhedron 1016 can present "3B$" within a user facing display when the polyhedron 1016 stops rolling.

When polyhedron 1016 is affected by multi-dimensional rotation 1030, pointers associated with each of the three datasets can be advanced accordingly. For example, polyhedron 1016 can rotated two times around the x-axis which can advance the pointer of the set associated with the x-axis to the element "5", twenty six times around the y-axis which can advance the pointer of the set associated with the y-axis to the element "A", and eleven times around the z-axis which can advance the pointer of the dataset associated with the z-axis to the element "%". When the polyhedron 1016 stops rotating, each of the elements can be presented within a user facing display of the polyhedron 1016. For example, polyhedron 1016 can present "5A %" within a user facing display when the polyhedron 1016 stops rolling.

When polyhedron 1016 is affected by multi-dimensional rotation 1040, pointers associated with each of the three datasets can be advanced accordingly. For example, polyhedron 1016 can rotated six times around the x-axis which can advance the pointer of the dataset associated with the x-axis to the element "3", five times around the y-axis which can advance the pointer of the dataset associated with the y-axis to the element "E", and ten times around the z-axis which can advance the pointer of the dataset associated with the z-axis to the element "%". When the polyhedron 1016 stops rotating, each of the elements can be presented within a user facing display of the polyhedron 1016. For example, polyhedron 1016 can present "3E %" within a user facing display when the polyhedron 1016 stops rolling.

Figure 11:
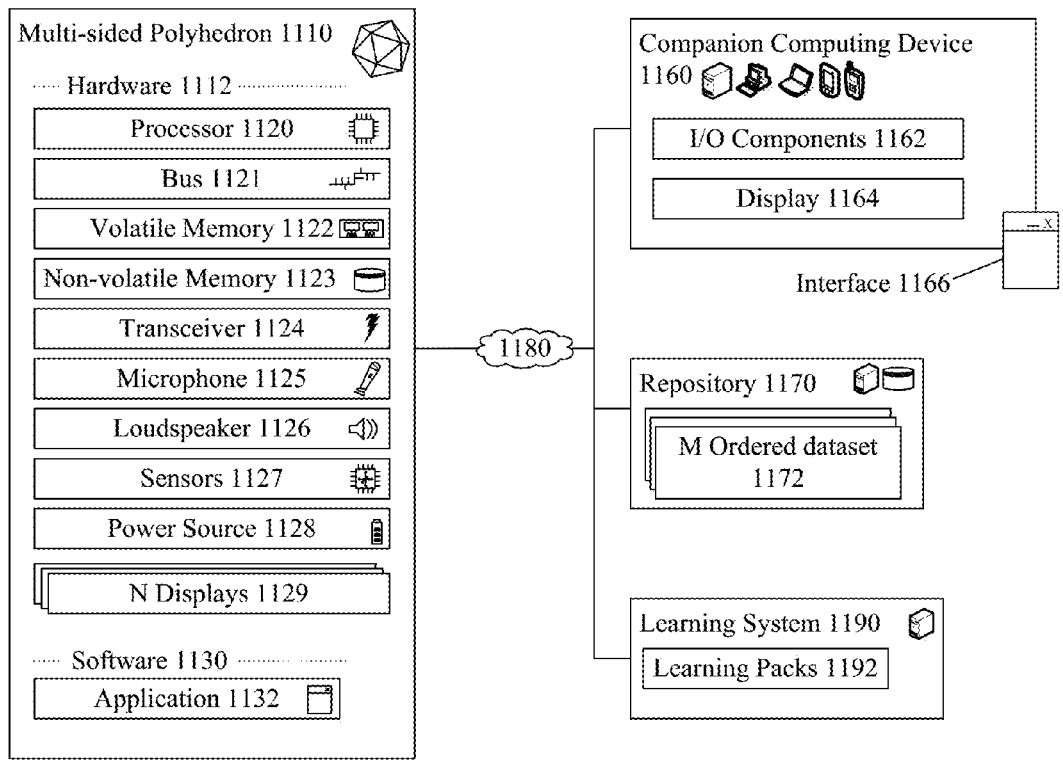
FIG. 11 is a schematic diagram illustrating a system for presenting elements from an ordered dataset within a graphical user interface of a multi-sided polyhedron responsive to the rotation of the polyhedron in accordance with an embodiment of the inventive arrangements disclosed herein.

FIG. 11 is a schematic diagram illustrating a system for presenting elements from an ordered dataset within a graphical user interface of a multi-sided polyhedron responsive to the rotation of the polyhedron in accordance with an embodiment of the inventive arrangements disclosed herein. System 1100 can be present in the context of embodiment 101, scenario 110, 160 embodiment 201, scenario 210, 260, embodiment 310, 401, 510, 610, scenario 630, embodiment 650, 710, 760, 810, 850, system 890, embodiment 910, 930, 950, 1010, and/or method 1200.

Multi-sided polyhedron 1110 can include, but is not limited to, hardware 1112, software 1130, and the like. Hardware 1112 can include, but is not limited to processor 1120, bus 1121, volatile memory 1122, non-volatile memory 1123, transceiver 1124, microphone 1125, loudspeaker 1126, sensors 1127, power source 1128, N-sides 1129, and the like. Software 1130 can include, but is not limited to, application 1132, application settings, user preferences, and the like. In one instance, software 1130 can be associated with a user interactive interface. User interactive interface can conform to a graphical user interface, a voice user interface, a text user interface, a mixed-mode interface, and the like. It should be appreciated that polyhedron 1110 can lack one or more of the components within system 1100.

Companion computing device 1160 can be a hardware/software entity permitting indirect interaction with polyhedron 1110. Interaction can include, but is not limited to, receiving data, conveying data, manipulating hardware 1112, manipulating software 1130, and the like. Device 1160 can include, but is not limited to, I/O components 1162, display 1164, interface 1166, and the like. Computing device 1160 can include, but is not limited to, a desktop computer, a laptop computer, a tablet computing device, a personal digital assistant (PDA), a mobile phone, and the like. In one instance, interface 366 can present and/or receive audio input/output 367 to/from components of polyhedron 1110. In one embodiment, interface 366 can present settings, M ordered dataset 1172, learning packs 1192 data, and the like. Interface 1166 can conform to a graphical user interface (GUI), a voice user interface (VUI), a mixed-mode interface, and the like.

Repository 1170 can be a hardware/software component able to persist M ordered dataset 1172, learning packs 1192, application 1132, settings, preferences, and the like. Repository 1170 can be a Storage Area Network (SAN), Network Attached Storage (NAS), and the like. Repository 1170 can conform to a relational database management system (RD-BMS), object oriented database management system (OOD-BMS), and the like. Repository 1170 can be communicatively linked to device 1160, system 1190, polyhedron 1110 in one or more traditional and/or proprietary mechanisms. In one instance, repository 1170 can be a component of a server cluster.

Network 1180 can be an electrical and/or computer network connecting one or more system 1100 components. Network 1180 can include, but is not limited to, twisted pair cabling, optical fiber, coaxial cable, and the like. Network 1180 can include any combination of wired and/or wireless components. Network 1180 topologies can include, but is not limited to, bus, star, mesh, and the like. Network 1180 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that system 1190, repository 1170 and/or companion computing device 1160 can be an optional component of system 1100 permitting that the disclosure functionality be retained. It should be appreciated that one or more components of system 1100 can be combined and/or separated based on functionality, usage, and the like. System 1100 can conform to a Service Oriented Architecture (SOA), Representational State Transfer (REST) architecture, and the like.

Learning system 1190 can be a hardware/software entity for conveying, distributing, and/or presenting learning packs 1192 educational content. System 1190 can include, but is not limited to, e-learning platforms, data cartridge systems (e.g., SD CARD based game consoles), and the like. Learning packs 1192 can include, but is not limited to, hardware and/or software content bundles, streaming content, Web-based content, and the like.

Figure 12:
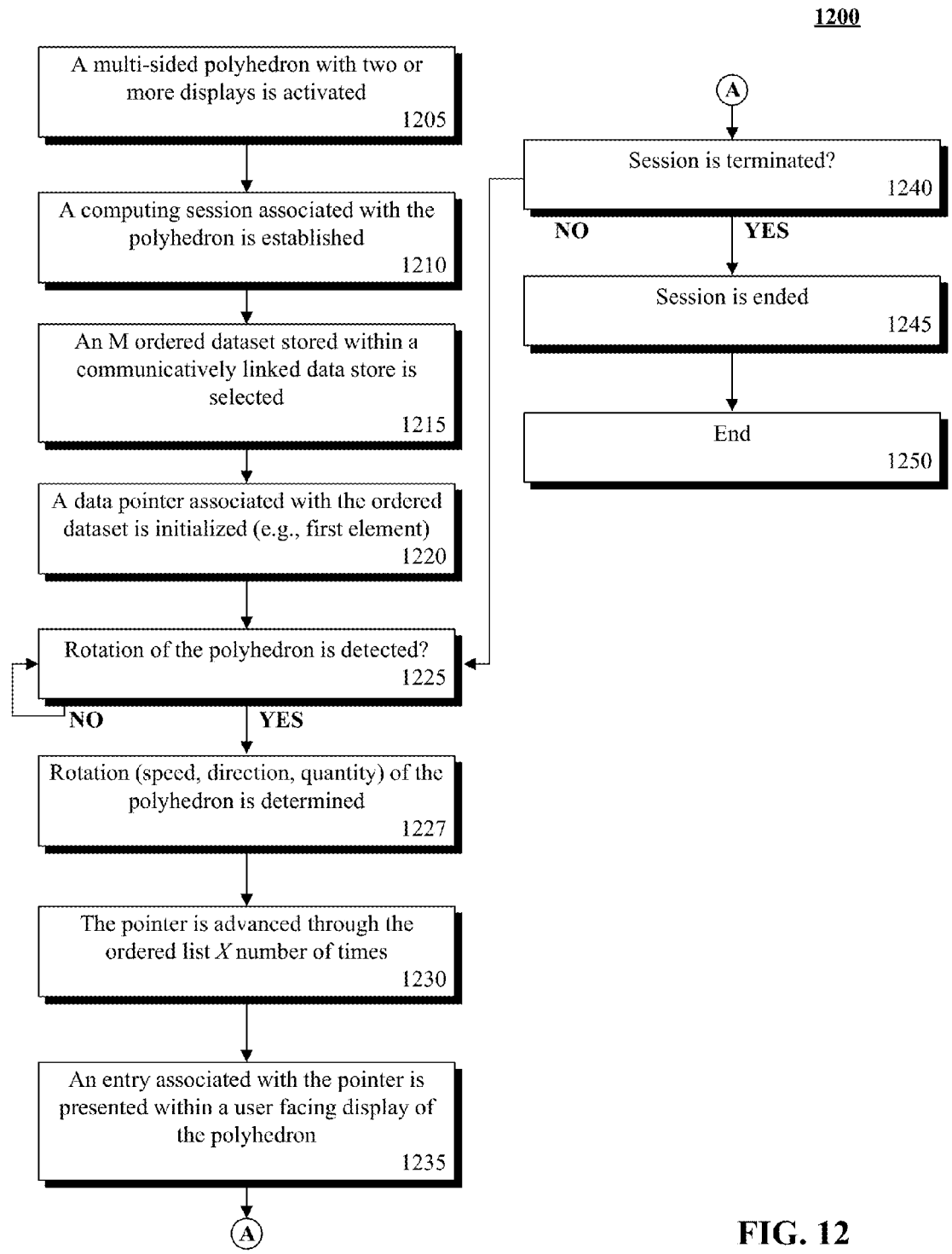
FIG. 12 is a flowchart illustrating a method for presenting elements from an ordered dataset within a graphical user interface of a multi-sided polyhedron responsive to the rotation of the polyhedron in accordance with an embodiment of the inventive arrangements disclosed herein.

FIG. 12 is a flowchart illustrating a method 1200 for presenting elements from an ordered dataset within a graphical user interface of a multi-sided polyhedron responsive to the rotation of the polyhedron in accordance with an embodiment of the inventive arrangements disclosed herein. In method 1200, a multi-sided polyhedron with two or more displays can present elements from an M ordered dataset responsive to the polyhedron rotation, where the M ordered dataset includes two or more elements. Method 1200 can be present in the context of embodiment 101, scenario 110, 160 embodiment 201, scenario 210, 260, embodiment 310, 401, 510, 610, scenario 630, embodiment 650, 710, 760, 810, 850, system 890, embodiment 910, 930, 950, 1010 and/or system 1100.

In step 1205, a multi-sided polyhedron with two or more displays can be activated. In step 1210, a computing session associated with the polyhedron is established. In step 1215, an M ordered dataset stored within a communicatively linked data store can be selected. In step 1220, a pointer associated with the ordered dataset can be initialized. For example, the pointer can be dataset to the first element. In one instance, the pointer can be dataset to a random element within the ordered dataset.

In step 1225, if rotation of the polyhedron is detected, the method can continue to step 1227, else return to step 1225. In step 1227, the rotation of the polyhedron can be determined. In one instance, the rotation direction, speed, and/or quantity can be determined utilizing traditional and/or proprietary mechanisms. In step 130, the pointer associated with the ordered dataset can be advanced through the ordered list X number of times, where X is the number of rotations. In step 1235, an entry associated with the pointer can be presented within a user facing display of the polyhedron. In step 1240, if the session is terminated, the method can continue to step 1245, else return to step 1225. In step 1245, the session can be ended. In step 1250, the method can end.

Drawings presented herein are for illustrative purposes only and should not be construed to limit the invention in any regard. It should be appreciated that method 1200 can be performed in real-time or near real-time. Further, method 200 can be performed in serial and/or in parallel. Steps 1225-1240 can be performed continuously until the session is terminated.

The flowchart and block diagrams in the FIGS. 1-12 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
  establishing a communications pathway between a data handling system and a physical input device, wherein the data handling system comprises one or more processors, one or more memories, and program instructions stored on at least one of the one or more memories, wherein at least one of the one or more processors execute the program instructions, wherein said physical input device is a physical object having N faces along an axis of rotation, wherein at least one of the N faces comprises of a display;
  presenting within a field of a graphical user interface of the display a content item from an ordered dataset of content items of the data handling system, wherein a number of discrete items in the ordered dataset of content items is M, where M is greater than N;

detecting rotations of the physical object along the axis of rotation, wherein each rotation of one of the N faces results in a navigation through the ordered dataset of content items; and responsive to each navigation through the ordered dataset of content items results in a corresponding presentation of the navigated to one of the content items within the field.

2. The method of claim 1, wherein presenting the rotationally-dependent dataset further comprises:

presenting probability dependent content within the display based on the detecting, wherein the display is a user facing display.

3. The method of claim 1, wherein the physical object is a free moving object that is not physically coupled to the data handling system, wherein the physical object comprises at least one sensor to determine which of the faces of the N sided object is a user facing face, wherein the physical object wirelessly communicates with the data handling system, wherein the wireless communications comprise at least one of conveying an indication from the at least one sensor to the data handling system and receiving an element from the ordered dataset.

4. The method of claim 1, wherein the physical object is an object with two opposing displays that is a free moving object, wherein each of the N faces corresponds to one side of the two or more sided object, wherein the physical object comprises at least one sensor to determine which of the faces of the two or more sided object is upwardly facing, wherein at least two sides of the physical object comprises a display area upon which data from a rotationally-dependent dataset is displayed, wherein a datum of the data displayed in the display area represents a navigated one of the content items of the ordered dataset.

5. The method of claim 1, wherein the data within the ordered dataset is randomized responsive to at least one of a programmatic action and a user initiated action.

6. The method of claim 1, wherein the data within the ordered dataset comprises at least one of a playing card graphic, wherein the graphic comprises of at least one of a pip, a face card graphic, and a motif.

7. The method of claim 1, wherein the ordered dataset represents a collection of cards, wherein the collection of cards is at least one of a playing card pack and a trading card game card pack, wherein the pack is at least one of a starter deck, a booster pack, a user organized deck, and a plurality of user owned digital assets associated with the trading card game.

8. The method of claim 1, wherein the ordered dataset is a multi-dimensional data structure wherein each dimension of the data structure is associated with at least one of a rotational axis, a content item data type, and a content item metadata.

9. A device comprising:

a solid polyhedral shell having N faces along an axis of rotation, wherein N is two or more;
motion detection components configured to detect motion along predetermined directional axes of the polyhedral shell having N faces; and
a data handler within the shell configured to capture movement data from the motion detection components, wherein the data handler comprises one or more processors, one or more memories, and program instructions stored on at least one of the one or more memories, wherein at least one of the one or more processors execute the program instructions, wherein the data handler navigates through an ordered dataset of content items such that one ordered data item of the ordered dataset is active at any one time, wherein a number of discrete items in the ordered dataset of content items is M, wherein M is greater than N, wherein the captured movement data indicates the solid polyhedral shell being rotated along the axis of rotation so that X number of faces are cycled as the object is rotated from the initial face to a post-rotation face of the N faces, wherein in response to the solid polyhedral shell being rotated, the data handler sequentially advances the data set by X.

10. The device of claim 9, wherein the solid polyhedral shell further comprises:

a display area embedded within at least one face upon which data from a dataset is displayed, wherein the data is a digital content associated with at least one of a board game, trading card game, and a tabletop game.

11. The device of claim 9, further comprising:

a speaker; and
an audio player providing electronic signals to the speaker, said audio player working in conjunction with the speaker being configured to play sounds in response to the rotational motion of the solid polyhedral shell.

12. The device of claim 9, further comprising:

a wireless transceiver configured to wirelessly transmit the captured movement data to a remotely located data handling system not physically coupled to the solid polyhedral shell, wherein the data handling system is communicatively linked to an educational learning system.

13. The device of claim 9, wherein the solid polyhedral shell further comprises:

two or more opposing displays, each of the two or more displays corresponds to the N faces, wherein each of the two or more displays comprises of a graphical user interface, wherein at least one of the graphical user interfaces presents at least one content item within at least one of the display when the display is visible to a user interacting with the solid polyhedral shell, wherein the content item is at least one of a question from the ordered data set and an answer from the ordered dataset responsive to rotation of the solid polyhedral shell.

14. The device of claim 9, further comprising:

a base module configured to allow near field communication with the solid polyhedral shell, wherein when the solid polyhedral shell is placed within proximity to trigger near field communication with the module, the base module conveying at least one content item from the data handling system to the solid polyhedral shell.

15. The device of claim 9, wherein the ordered dataset is a multi-dimensional data structure wherein each dimension of the data structure is associated with at least one of a rotational axis, a content item data type, and a content item metadata.

16. The device of claim 9, wherein at least one selection mechanism is contained within at least one side of the solid polyhedral shell.

17. A system comprising:

a physical object having at least N faces along an axis of rotation and having an interior space, wherein N is two or more, wherein the entire physical object is rotated in space to visually expose different ones of the N faces to a visual vantage point of a human observer;
motion detection components, which are physical components contained within the interior space, configured to detect motion along at least the axis of rotation of the physical object; and a data handler configured to capture movement data from the motion detection components, wherein the data handler comprises one or more processors, one or more memories, and program instructions stored on at least one of the one or more memories, wherein at least one of the one or more processors execute the program instructions, wherein the data handler navigates through an ordered dataset of content items such that one ordered data item of the ordered dataset is active at any one time, wherein a number of discrete items in the ordered dataset of content items is M, wherein M is greater than N, wherein the captured movement data indicates the physical object being rotated along the axis of rotation so that X number of faces are cycled as the object is rotated from the initial face to a post-rotation face of the N faces, wherein in response to the solid polyhedral shell being rotated, the data handler sequentially advances the data set by X.

18. The system of claim 17, wherein the physical object further comprises:

N face-specific display areas, one of the N face-specific display areas corresponding to each of the N faces, wherein one of the N face-specific display areas corresponding to a visually exposed one of the different ones of the N faces to a vantage point of a human observer visually displays a currently active data item of the ordered data set as determined by the data handler.

19. The system of claim 17, further comprising:

a speaker; and an audio player providing electronic signals to the speaker, said audio player working in conjunction with the speaker being configured to play sounds in response to rotational motion of the physical object.

20. The system of claim 17, further comprising:

a wireless transceiver configured to wirelessly transmit the captured movement data to a remotely located data handling system not physically coupled to the physical object.

* * * * *